(12) United States Patent
Kondo et al.

(10) Patent No.: US 12,353,263 B2
(45) Date of Patent: Jul. 8, 2025

(54) REMOVABLE MEMORY DEVICE

(71) Applicant: Kioxia Corporation, Tokyo (JP)

(72) Inventors: Atsushi Kondo, Yokohama (JP);
Akihisa Fujimoto, Sagamihara (JP);
Ryo Yonezawa, Shinagawa (JP);
Masaomi Teranishi, Yokohama (JP)

(73) Assignee: Kioxia Corporation, Tokyo (JP)

( * ) Notice: Subject to any disclaimer, the term of this patent is extended or adjusted under 35 U.S.C. 154(b) by 30 days.

(21) Appl. No.: 18/353,159

(22) Filed: Jul. 17, 2023

(65) Prior Publication Data

US 2023/0359257 A1    Nov. 9, 2023

Related U.S. Application Data

(63) Continuation of application No. PCT/JP2021/016146, filed on Apr. 21, 2021.

(30) Foreign Application Priority Data

Jan. 19, 2021   (JP) .................................. 2021-006531

(51) Int. Cl.
*G06F 1/26* (2006.01)
*G06F 1/18* (2006.01)
(Continued)

(52) U.S. Cl.
CPC ................ *G06F 1/26* (2013.01); *G06F 1/266* (2013.01); *G06F 1/189* (2013.01); *G06F 1/3225* (2013.01);
(Continued)

(58) Field of Classification Search
CPC .......... G06F 1/26; G06F 1/266; G06F 1/3275; G06F 1/189; G06F 1/3225; G09K 19/06037
(Continued)

(56) References Cited

U.S. PATENT DOCUMENTS 7,660,603 B2    2/2010 Noguchi et al.
7,961,544 B2    6/2011 Ben-Rubi
(Continued)

FOREIGN PATENT DOCUMENTS

JP            11338584 A  * 12/1999
JP         2009-251888 A    10/2009
(Continued)

OTHER PUBLICATIONS

"Product Technical Specification: AirPrime HL6528x", Sierra Wireless, Rev. 4.2, Jun. 19, 2014, 70 pages, XP 055210951.
(Continued)

*Primary Examiner* — Ji H Bae
(74) *Attorney, Agent, or Firm* — Oblon, McClelland, Maier & Neustadt, L.L.P.

(57) ABSTRACT

According to one embodiment, when a current consumption class supported by a removable memory device is another current consumption class different from a first current consumption class with a largest current consumption value among plural types of current consumption classes, the first current consumption value consumed from a first power by the removable memory device is smaller than or equal to a third permissible current value for a first power defined in the other current consumption class; and a second current consumption value consumed from a second power by the removable memory device is smaller than or equal to a fourth permissible current value for the second power defined in the other current consumption class.

14 Claims, 22 Drawing Sheets

(51) Int. Cl.
   *G06F 1/3225* (2019.01)
   *G06F 1/3234* (2019.01)
   *G06K 19/06* (2006.01)
(52) U.S. Cl.
   CPC ...... *G06F 1/3275* (2013.01); *G06K 19/06037* (2013.01)
(58) Field of Classification Search
   USPC .......................................... 713/300; 365/226
   See application file for complete search history.

(56) References Cited

U.S. PATENT DOCUMENTS

| | | | | |
|---|---|---|---|---|
| 12,048,110 | B2* | 7/2024 | Fujimoto | ............. H05K 5/0247 |
| 2007/0055821 | A1* | 3/2007 | Ootsuka | .................. G06F 3/061 |
| | | | | 711/115 |
| 2009/0125673 | A1* | 5/2009 | Ito | ....................... G06F 12/1433 |
| | | | | 711/E12.001 |
| 2020/0327920 | A1 | 10/2020 | Fujimoto et al. | |
| 2021/0055866 | A1 | 2/2021 | Fujimoto et al. | |
| 2023/0244288 | A1* | 8/2023 | Fujimoto | ................ H02M 3/04 |
| | | | | 713/300 |
| 2024/0334631 | A1* | 10/2024 | Fujimoto | ......... G06K 19/07743 |

FOREIGN PATENT DOCUMENTS

| | | |
|---|---|---|
| JP | 4343908 B2 | 10/2009 |
| JP | 5718812 B2 | 5/2015 |
| JP | 2019-192204 A | 10/2019 |
| JP | 2020-173765 A | 10/2020 |
| TW | I705380 B | 9/2020 |

OTHER PUBLICATIONS

"Product Technical Specification: AirPrime HL6528RDx", Sierra Wireless, Rev. 3.0, Mar. 3, 2016, 67 pages, XP 055666999.

* cited by examiner

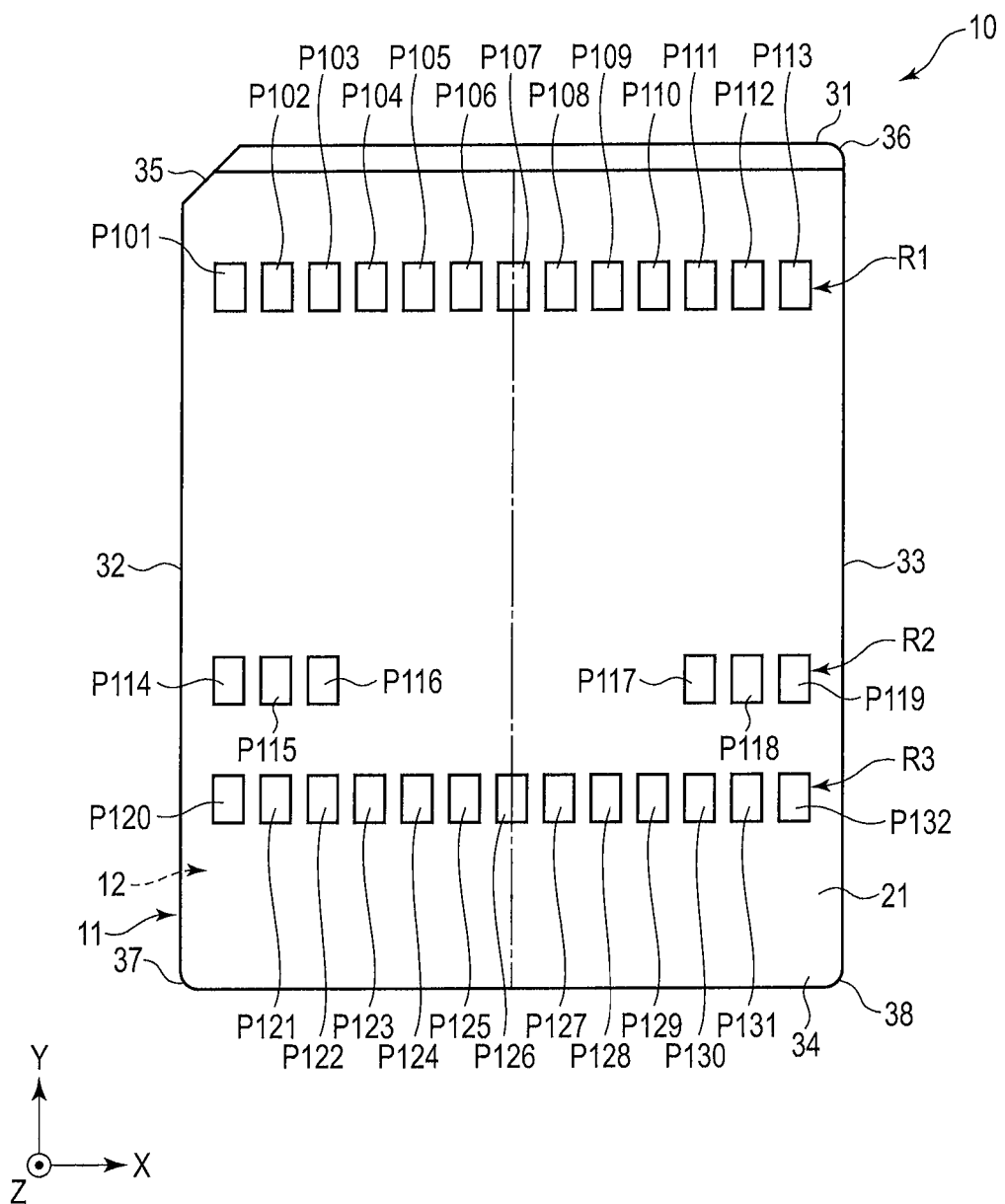
F I G. 3

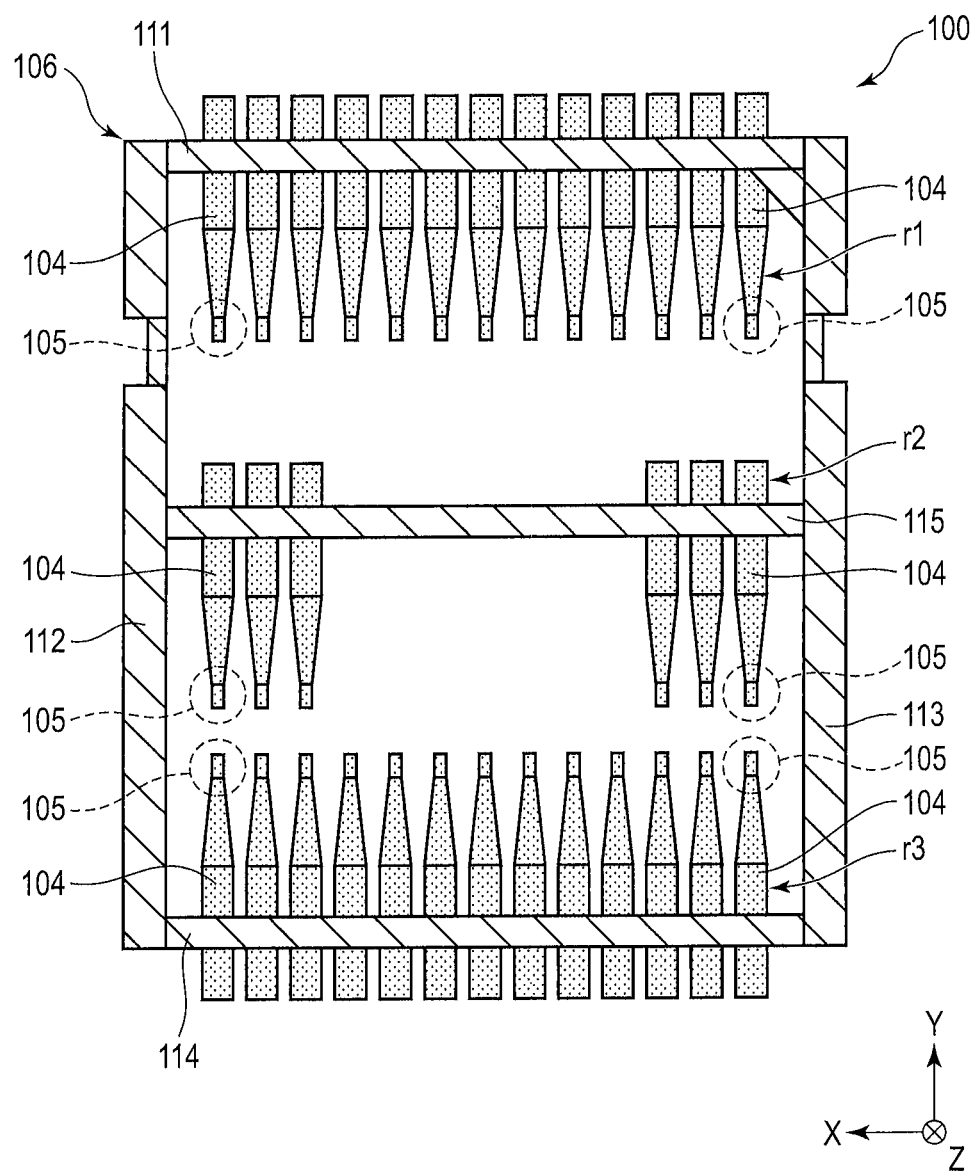
F I G. 4

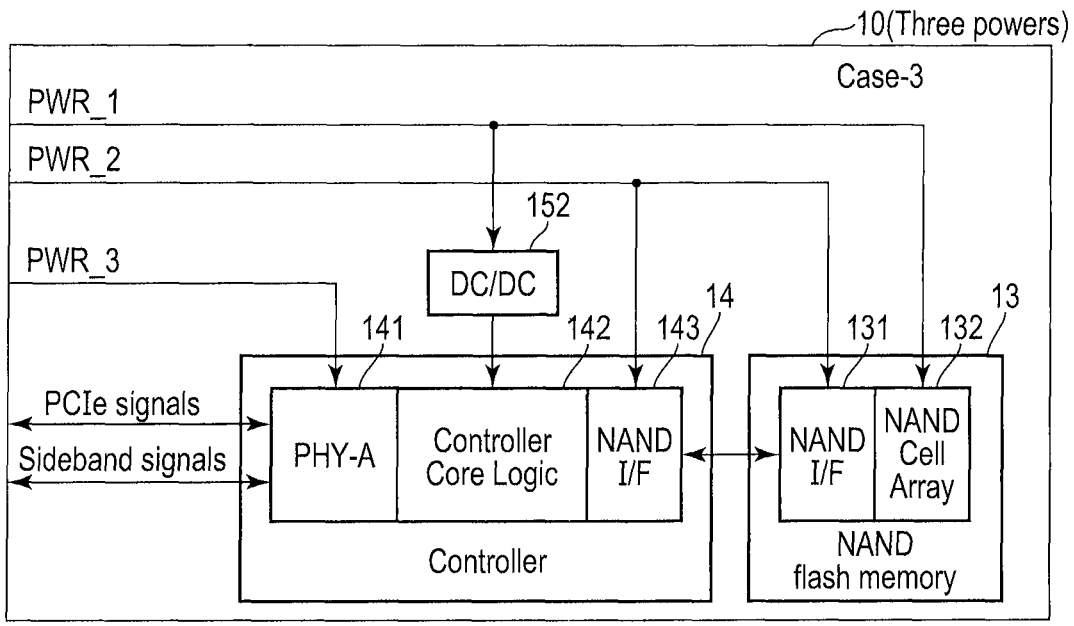
F I G. 10
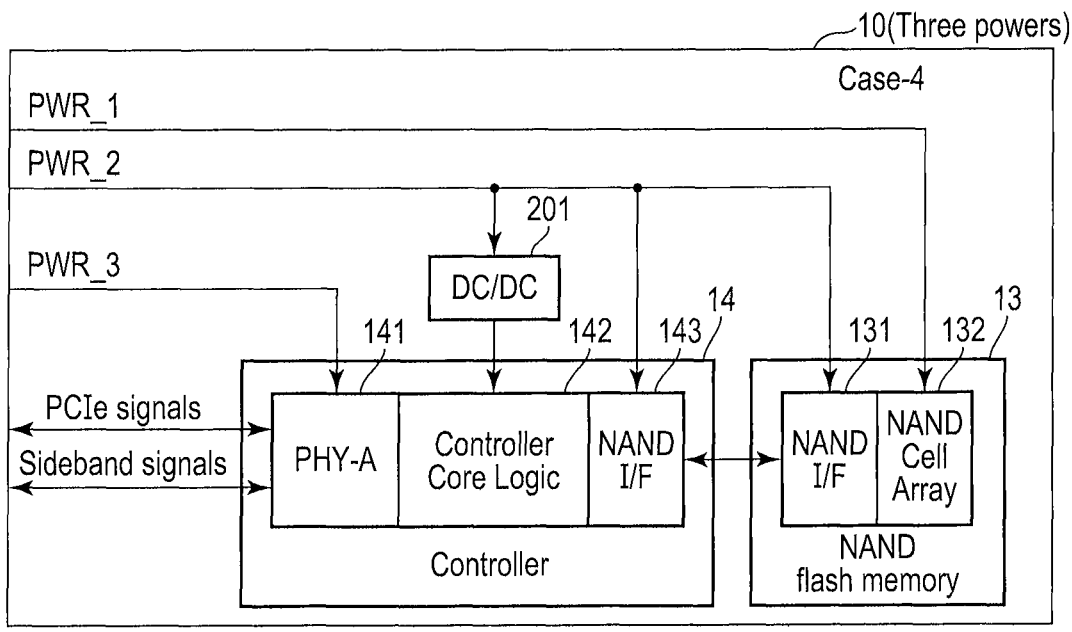
F I G. 11

| Power configuration | Two powers | | Three powers | |
|---|---|---|---|---|
| | Case-1 | Case-2 | Case-3 | Case-4 |
| PWR_1 3.3/2.5V | PHY-A Core Logic NAND Cell | PHY-A NAND Cell | Core Logic NAND Cell | NAND Cell |
| PWR_2 1.2V | NAND IF | Core Logic NAND IF | NAND IF | Core Logic NAND IF |
| PWR_3 1.8V | - | - | PHY-A | PHY-A |

PWR : Power Rail

F I G. 12

| Name of current consumption class | Three-power configuration | | | Types | |
|---|---|---|---|---|---|
| | Two-power configuration | | | | |
| | PWR_1 | PWR_2 | PWR_3 | Three classes | Four classes |
| CC1 | $I_{P1C1}$ | $I_{P2C1}$ | $I_{P3C1}$ | Current consumption value (Large) | Current consumption value (Large) |
| CC2 | $I_{P1C2}$ | $I_{P2C2}$ | $I_{P3C2}$ | Current consumption value (Medium) | Current consumption value (Medium) |
| CC3 | $I_{P1C3}$ | $I_{P2C3}$ | $I_{P3C3}$ | Current consumption value (Small) | Current consumption value (Small) |
| CC4 | $I_{P1C4}$ | $I_{P2C4}$ | $I_{P3C4}$ | - | Current consumption value (Minimum) |

F I G. 13

| | Current Class 2-4 current consumption formulas | Permissible current consumption reduction rates |
|---|---|---|
| $I_{P1}$ | MIN[IP1C1, IP1C1max ×N ×ratio] | CC2 : 72%, CC3 : 56%, CC4 : 47% |
| $I_{P2}$ | MIN[IP2C1, IP2C1max ×M ×ratio] | CC2 : 72%, CC3 : 56%, CC4 : 47% |
| $I_{P3}$ | MIN[IP3C1, IP3C1max ×L ×ratio] | CC2 : 72%, CC3 : 56%, CC4 : 47% |

Current Class and Current Class Guide (1)(2) : IP1=IP2
Current Class and Current Class Guide (1')(2') : IP1≠IP2
N/M/L : Number of terminals of PWR

F I G. 14

Current consumption value: in a case where PWR maximum current value =1.2A/terminal, PWR_1= three terminals, PWR_2= Three terminals, and PWR_3= One terminal :

CC1:  IP1C1  CC1 current of PWR_1  PWR_1 permissible current value ×3
     IP2C1  CC1 current of PWR_2  PWR_2 permissible current value ×3
     IP3C1  CC1 current of PWR_3  PWR_3 permissible current value ×1

[ MIN[a,b] = a(a<=b), b(a>b) ]

CC2:  IP1C2  CC2 current of PWR_1  MIN[IP1C1, IP1C1max ×3 ×72%]  ; IP1C1max=CC13%
     IP2C2  CC2 current of PWR_2  MIN[IP2C1, IP2C1max ×3 ×72%]  ; IP2C1max=CC13%
     IP3C2  CC2 current of PWR_3  MIN[IP3C1, IP3C1max ×1 ×72%]  ; IP3C1max=CC13%

CC3:  IP1C3  CC3 current of PWR_1  MIN[IP1C1, IP1C1max ×3 ×56%]
     IP2C3  CC3 current of PWR_2  MIN[IP2C1, IP2C1max ×3 ×56%]
     IP3C3  CC3 current of PWR_3  MIN[IP3C1, IP3C1max ×1 ×56%]

CC4:  IP1C4  CC4 current of PWR_1  MIN[IP1C1, IP1C1max ×3 ×47%]
     IP2C4  CC4 current of PWR_2  MIN[IP2C1, IP2C1max ×3 ×47%]
     IP3C4  CC4 current of PWR_3  MIN[IP3C1, IP3C1max ×1 ×47%]

F I G. 15

| Permissible current of PWR_1 (Normal 2.5V) |||
| --- | --- | --- |
| Contact resistance [mΩ] | Permissible current [A] -1% fluctuation | Permissible current [A] -2% fluctuation |
| 30 | 1.20 | 1.20 |
| 40 | 1.20 | 1.20 |
| 50 | 1.20 | 1.00 |
| 60 | 1.20 | (0.83) |
| 70 | 1.07 | 0.71 |
| 80 | 0.94 | 0.63 |

Conditions : Vps = 2.50 V, Vd_min = 2.40 V

F I G. 16

| Permissible current of PWR_2 (Normal 1.2V) |||
| --- | --- | --- |
| Contact resistance [mΩ] | Permissible current [A] -1% fluctuation | Permissible current [A] -2% fluctuation |
| 30 | 1.20 | 1.20 |
| 40 | 1.20 | 0.90 |
| 50 | 0.96 | 0.72 |
| 60 | 0.80 | (0.60) |
| 70 | 0.69 | 0.51 |
| 80 | 0.60 | 0.45 |

Conditions : Vps = 1.20 V, Vd_min = 1.14 V

F I G. 17

| CC current ratio (to CC1max) | | | | |
|---|---|---|---|---|
| Class | CC1max | CC2max | CC3max | CC4max |
| ratio | 100% | 72% | 56% | 47% |
| IP1 | 3.6 | 2.6 | 2.0 | 1.7 |
| IP2 | 3.6 | 2.6 | 2.0 | 1.7 |

FIG. 18

| CCG(Current Class Guide) | | | |
|---|---|---|---|
| | IP1[A] | IP2[A] | Performance examples [GB/s] |
| CCG-A | 2.6~3.6 | 2.6~3.6 | 4~8 |
| CCG-B | 2.0~2.6 | 2.0~2.6 | 2~5 |
| CCG-C | 1.7~2.0 | 1.7~2.0 | 1~3 |
| CCG-D | <1.7 | <1.7 | <2 |

CCG classification condition: satisfy (1) or (2)
(1) Both IP1 and IP2 fall within current range of table
(2) Either of IP1 and IP2 falls within current range of table and the other is a current value less than or equal to current range

FIG. 19A

Current Class and Current Class Guide (1)

Maximum permissible current value=CC0

| CC#$% | IP1[A] | IP2[A] | TTL[A] |
|---|---|---|---|
| 30mΩ 1% | CC031 | 3.60 | 3.60 | 7.2 |
| 40mΩ 1% | CC041 | 3.60 | 3.60 | 7.2 |
| 50mΩ 1% | CC051 | 3.60 | 2.88 | 6.5 |
| 60mΩ 1% | CC061 | 3.60 | 2.40 | 6.0 |
| 70mΩ 1% | CC071 | 3.21 | 2.06 | 5.3 |
| 80mΩ 1% | CC081 | 2.81 | 1.80 | 4.6 |

CC1(1%)

| CC#$% | IP1[A] | IP2[A] | TTL[A] | CCG | CCG<IP |
|---|---|---|---|---|---|
| CC131 | 3.6 | 3.6 | 7.2 | A(1)~ | A |
| CC141 | 3.6 | 3.6 | 7.2 | A(1)~ | A |
| CC151 | 3.6 | 2.8 | 6.4 | A(2)~ | B |
| CC161 | 3.6 | 2.4 | 6.0 | A(2)~ | C |
| CC171 | 3.2 | 2.0 | 5.3 | A(2)~ | C |
| CC181 | 2.8 | 1.8 | 4.6 | A(2)~ | D |

CCG<IP : Upper limit current value of CCG<MIN[IP1,IP2]

<View of CCG in table>
A~: CCG-A compatible (if possible, *it may be CCG-B,C,D)
(*: If required performance can be satisfied: current consumption becomes large with high performance)

CC2(1%)

| CC#$% | IP1[A] | IP2[A] | TTL[A] | CCG | CCG<IP |
|---|---|---|---|---|---|
| CC231 | 2.6 | 2.6 | 5.2 | B(1)~ | B |
| CC241 | 2.6 | 2.6 | 5.2 | B(1)~ | B |
| CC251 | 2.6 | 2.6 | 5.2 | B(1)~ | B |
| CC261 | 2.4 | 2.4 | 4.8 | B(1)~ | C |
| CC271 | 2.0 | 2.0 | 4.0 | C(1)~ | C |
| CC281 | 1.8 | 1.8 | 3.6 | C(1)~ | D |

CC3(1%)

| CC#$% | IP1[A] | IP2[A] | TTL[A] | CCG | CCG<IP |
|---|---|---|---|---|---|
| CC331 | 2.0 | 2.0 | 4.0 | C(1)~ | C |
| CC341 | 2.0 | 2.0 | 4.0 | C(1)~ | C |
| CC351 | 2.0 | 2.0 | 4.0 | C(1)~ | C |
| CC361 | 2.0 | 2.0 | 4.0 | C(1)~ | C |
| CC371 | 2.0 | 2.0 | 4.0 | C(1)~ | C |
| CC381 | 1.8 | 1.8 | 3.6 | C(1)~ | D |

CC4(1%)

| CC#$% | IP1[A] | IP2[A] | TTL[A] | CCG | CCG<IP |
|---|---|---|---|---|---|
| CC431 | 1.7 | 1.7 | 3.4 | D(1) | D |
| CC441 | 1.7 | 1.7 | 3.4 | D(1) | D |
| CC451 | 1.7 | 1.7 | 3.4 | D(1) | D |
| CC461 | 1.7 | 1.7 | 3.4 | D(1) | D |
| CC471 | 1.7 | 1.7 | 3.4 | D(1) | D |
| CC481 | 1.7 | 1.7 | 3.4 | D(1) | D |

F I G. 19B

Current Class and Current Class Guide (2)

Maximum permissible current value=CC0

| | CC#$% | IP1[A] | IP2[A] | TTL[A] |
|---|---|---|---|---|
| 30mΩ 2% | CC032 | 3.60 | 3.60 | 7.20 |
| 40mΩ 2% | CC042 | 3.60 | 2.70 | 6.30 |
| 50mΩ 2% | CC052 | 3.00 | 2.16 | 5.16 |
| 60mΩ 2% | CC062 | 2.50 | 1.80 | 4.30 |
| 70mΩ 2% | CC072 | 2.14 | 1.54 | 3.69 |
| 80mΩ 2% | CC082 | 1.88 | 1.35 | 3.23 |

CC1(2%)

| CC#$% | IP1[A] | IP2[A] | TTL[A] | CCG | CCG<IP |
|---|---|---|---|---|---|
| CC132 | 3.6 | 3.6 | 7.2 | A(1)~ | A |
| CC142 | 3.6 | 2.7 | 6.3 | A(2)~ | B |
| CC152 | 3.0 | 2.1 | 5.1 | A(2)~ | C |
| CC162 | 2.5 | 1.8 | 4.3 | B(2)~ | D |
| CC172 | 2.1 | 1.5 | 3.6 | B(2)~ | - |
| CC182 | 1.8 | 1.3 | 3.1 | C(2)~ | - |

CC2(2%)

| CC#$% | IP1[A] | IP2[A] | TTL[A] | CCG | CCG<IP |
|---|---|---|---|---|---|
| CC232 | 2.6 | 2.6 | 5.2 | B(1)~ | B |
| CC242 | 2.6 | 2.6 | 5.2 | B(1)~ | B |
| CC252 | 2.1 | 2.1 | 4.2 | B(1)~ | C |
| CC262 | 1.8 | 1.8 | 3.6 | C(1)~ | D |
| CC272 | 1.5 | 1.5 | 3.0 | D(1) | - |
| CC282 | 1.3 | 1.3 | 2.6 | D(1) | - |

CC3(2%)

| CC#$% | IP1[A] | IP2[A] | TTL[A] | CCG | CCG<IP |
|---|---|---|---|---|---|
| CC332 | 2.0 | 2.0 | 4.0 | C(1)~ | C |
| CC342 | 2.0 | 2.0 | 4.0 | C(1)~ | C |
| CC352 | 2.0 | 2.0 | 4.0 | C(1)~ | C |
| CC362 | 1.8 | 1.8 | 3.6 | C(1)~ | D |
| CC372 | 1.5 | 1.5 | 3.0 | D(1) | - |
| CC382 | 1.3 | 1.3 | 2.6 | D(1) | - |

CC4(2%)

| CC#$% | IP1[A] | IP2[A] | TTL[A] | CCG | CCG<IP |
|---|---|---|---|---|---|
| CC432 | 1.7 | 1.7 | 3.4 | D(1) | D |
| CC442 | 1.7 | 1.7 | 3.4 | D(1) | D |
| CC452 | 1.7 | 1.7 | 3.4 | D(1) | D |
| CC462 | 1.7 | 1.7 | 3.4 | D(1) | D |
| CC472 | 1.5 | 1.5 | 3.0 | D(1) | - |
| CC482 | 1.3 | 1.3 | 2.6 | D(1) | - |

CCG<IP : Upper limit current value of CCG<MIN[IP1,IP2]

<View of CCG in table>
A~: CCG-A compatible (if possible, *it may be CCG-B,C,D)
(*: If required performance can be satisfied: current consumption becomes large with high performance)

F I G. 19C

Current Class and Current Class Guide (1')

Maximum permissible current value=CC0

| | CC#$% | IP1[A] | IP2[A] | TTL[A] |
|---|---|---|---|---|
| 30mΩ 1% | CC031 | 3.60 | 3.60 | 7.2 |
| 40mΩ 1% | CC041 | 3.60 | 3.60 | 7.2 |
| 50mΩ 1% | CC051 | 3.60 | 2.88 | 6.5 |
| 60mΩ 1% | CC061 | 3.60 | 2.40 | 6.0 |
| 70mΩ 1% | CC071 | 3.21 | 2.06 | 5.3 |
| 80mΩ 1% | CC081 | 2.81 | 1.80 | 4.6 |

CC1(1%)

| CC#$% | IP1[A] | IP2[A] | TTL[A] | CCG | CCG<IP |
|---|---|---|---|---|---|
| CC131 | 3.6 | 3.6 | 7.2 | A(1)~ | A |
| CC141 | 3.6 | 3.6 | 7.2 | A(1)~ | A |
| CC151 | 3.6 | 2.8 | 6.4 | A(2)~ | B |
| CC161 | 3.6 | 2.4 | 6.0 | A(2)~ | C |
| CC171 | 3.2 | 2.0 | 5.3 | A(2)~ | C |
| CC181 | 2.8 | 1.8 | 4.6 | A(2)~ | D |

CCG<IP : Upper limit current value of CCG<MIN[IP1,IP2]

<View of CCG in table>
A~: CCG-A compatible (if possible, *it may be CCG-B,C,D)
(*: If required performance can be satisfied: current consumption becomes large with high performance)

CC2(1%)

| CC#$% | IP1[A] | IP2[A] | TTL[A] | CCG | CCG<IP |
|---|---|---|---|---|---|
| CC231 | 2.6 | 2.6 | 5.2 | B(1)~ | B |
| CC241 | 2.6 | 2.6 | 5.2 | B(1)~ | B |
| CC251 | 2.6 | 2.6 | 5.2 | B(1)~ | B |
| CC261 | 2.6 | 2.4 | 5.0 | B(1)~ | C |
| CC271 | 2.6 | 2.0 | 4.6 | C(1)~ | C |
| CC281 | 2.6 | 1.8 | 4.4 | C(1)~ | D |

CC3(1%)

| CC#$% | IP1[A] | IP2[A] | TTL[A] | CCG | CCG<IP |
|---|---|---|---|---|---|
| CC331 | 2.0 | 2.0 | 4.0 | C(1)~ | C |
| CC341 | 2.0 | 2.0 | 4.0 | C(1)~ | C |
| CC351 | 2.0 | 2.0 | 4.0 | C(1)~ | C |
| CC361 | 2.0 | 2.0 | 4.0 | C(1)~ | C |
| CC371 | 2.0 | 2.0 | 4.0 | C(1)~ | C |
| CC381 | 2.0 | 1.8 | 3.8 | C(1)~ | D |

CC4(1%)

| CC#$% | IP1[A] | IP2[A] | TTL[A] | CCG | CCG<IP |
|---|---|---|---|---|---|
| CC431 | 1.7 | 1.7 | 3.4 | D(1)~ | D |
| CC441 | 1.7 | 1.7 | 3.4 | D(1)~ | D |
| CC451 | 1.7 | 1.7 | 3.4 | D(1)~ | D |
| CC461 | 1.7 | 1.7 | 3.4 | D(1)~ | D |
| CC471 | 1.7 | 1.7 | 3.4 | D(1)~ | D |
| CC481 | 1.7 | 1.7 | 3.4 | D(1)~ | D |

F I G. 19D

Current Class and Current Class Guide (2')

Maximum permissible current value=CC0

| | CC#$% | IP1[A] | IP2[A] | TTL[A] | CCG | CCG<IP |
|---|---|---|---|---|---|---|
| 30mΩ 2% | CC032 | 3.60 | 3.60 | 7.20 | A(1)~ | A |
| 40mΩ 2% | CC042 | 3.60 | 2.70 | 6.30 | A(2)~ | B |
| 50mΩ 2% | CC052 | 3.00 | 2.16 | 5.16 | A(2)~ | C |
| 60mΩ 2% | CC062 | 2.50 | 1.80 | 4.30 | B(2)~ | D |
| 70mΩ 2% | CC072 | 2.14 | 1.54 | 3.69 | B(2)~ | - |
| 80mΩ 2% | CC082 | 1.88 | 1.35 | 3.23 | C(2)~ | - |

CC1(2%)

| CC#$% | IP1[A] | IP2[A] | TTL[A] | CCG | CCG<IP |
|---|---|---|---|---|---|
| CC132 | 3.6 | 3.6 | 7.2 | A(1)~ | A |
| CC142 | 3.6 | 2.7 | 6.3 | A(2)~ | B |
| CC152 | 3.0 | 2.1 | 5.1 | A(2)~ | C |
| CC162 | 2.5 | 1.8 | 4.3 | B(2)~ | D |
| CC172 | 2.1 | 1.5 | 3.6 | B(2)~ | - |
| CC182 | 1.8 | 1.3 | 3.1 | C(2)~ | - |

CC2(2%)

| CC#$% | IP1[A] | IP2[A] | TTL[A] | CCG | CCG<IP |
|---|---|---|---|---|---|
| CC232 | 2.6 | 2.6 | 5.2 | B(1)~ | B |
| CC242 | 2.6 | 2.6 | 5.2 | B(1)~ | B |
| CC252 | 2.6 | 2.1 | 4.7 | B(1)~ | C |
| CC262 | 2.5 | 1.8 | 4.3 | B(2)~ | D |
| CC272 | 2.1 | 1.5 | 3.6 | B(2)~ | - |
| CC282 | 1.8 | 1.3 | 3.1 | C(2)~ | - |

CC3(2%)

| CC#$% | IP1[A] | IP2[A] | TTL[A] | CCG | CCG<IP |
|---|---|---|---|---|---|
| CC332 | 2.0 | 2.0 | 4.0 | C(1)~ | C |
| CC342 | 2.0 | 2.0 | 4.0 | C(1)~ | C |
| CC352 | 2.0 | 2.0 | 4.0 | C(1)~ | C |
| CC362 | 2.0 | 1.8 | 3.8 | C(1)~ | D |
| CC372 | 2.0 | 1.5 | 3.5 | C(2)~ | - |
| CC382 | 1.8 | 1.3 | 3.1 | C(2)~ | - |

CC4(2%)

| CC#$% | IP1[A] | IP2[A] | TTL[A] | CCG | CCG<IP |
|---|---|---|---|---|---|
| CC432 | 1.7 | 1.7 | 3.4 | D(1) | D |
| CC442 | 1.7 | 1.7 | 3.4 | D(1) | D |
| CC452 | 1.7 | 1.7 | 3.4 | D(1) | D |
| CC462 | 1.7 | 1.7 | 3.4 | D(1) | D |
| CC472 | 1.7 | 1.5 | 3.2 | D(1) | - |
| CC482 | 1.7 | 1.3 | 3.0 | D(1) | - |

CCG<IP : Upper limit current value of CCG<MIN[IP1,IP2]

<View of CCG in table>
A~: CCG-A compatible (if possible, *it may be CCG-B,C,D)
(*: If required performance can be satisfied: current consumption becomes large with high performance)

F I G. 19E

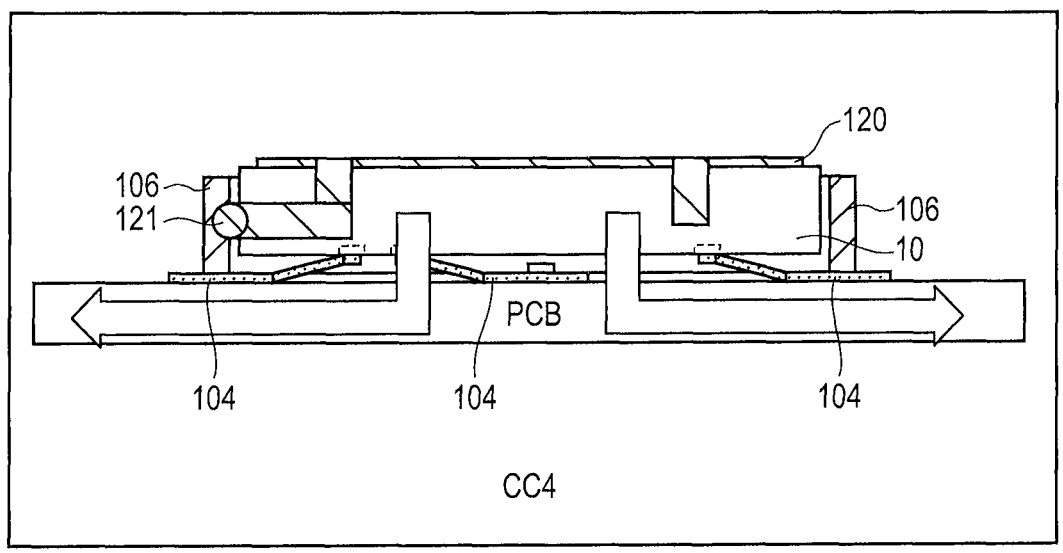
F I G. 26

REMOVABLE MEMORY DEVICE

CROSS-REFERENCE TO RELATED APPLICATIONS

This application is a Continuation Application of PCT Application No. PCT/JP2021/016146, filed Apr. 21, 2021 and based upon and claiming the benefit of priority from Japanese Patent Application No. 2021-006531, filed Jan. 19, 2021, the entire contents of all of which are incorporated herein by reference.

FIELD

Embodiments described herein relate generally to a removable memory device operating with plural types of powers supplied from a host.

BACKGROUND

In recent years, small, high-speed, and large-capacity removable memory devices have been developed.

As such a removable memory device, a removable memory device that operates with plural types of powers having voltages different from each other is known.

In standardizing such a removable memory device with the multiple power configuration, it is required to implement a new technology capable of facilitating the design of the power supply configuration on the host side necessary to operate the removable memory device.

BRIEF DESCRIPTION OF THE DRAWINGS

FIG. 3 is a plan view illustrating an example of an outer shape of the removable memory device according to the embodiment, and an arrangement example of a plurality of terminals.

FIG. 4 is a plan view illustrating an outer shape of a socket into which the removable memory device according to the embodiment is inserted, and an arrangement example of a plurality of lead terminals.

FIG. 10 is a block diagram illustrating a power configuration example of the removable memory system according to the embodiment operating with three powers.

FIG. 11 is a block diagram illustrating another power configuration example of the removable memory system according to the embodiment operating with three powers.

FIG. 12 is a diagram illustrating four power configuration examples applicable to the removable memory system according to the embodiment.

FIG. 13 is a diagram illustrating plural types of current consumption classes.

FIG. 14 is a diagram illustrating a current consumption calculation formula and a permissible current reduction rate defined for each power supply in each current consumption class.

FIG. 15 is a diagram illustrating an example of the current consumption calculation formula and an example of the permissible current reduction rate defined for each power supply in each current consumption class.

FIG. 16 is a diagram illustrating a permissible current value of a first power supply calculated based on a contact resistance, a rate of power supply voltage fluctuation of the first power supply, and a lower limit voltage of the first power supply.

FIG. 17 is a diagram illustrating a permissible current value of a second power supply calculated based on a contact resistance, a rate of power supply voltage fluctuation of the second power supply, and a lower limit voltage of the second power supply.

FIG. 18 is a diagram illustrating Current Class current ratios to CC1max and the permissible current of each power supply for each of four types of current classes CC1 to CC4.

FIG. 19A is a diagram illustrating a current consumption class guide indicative of the permissible current value of each power and the device performance for each of plural types of current consumption class guide categories.

FIG. 19B is a diagram illustrating the current class and current class guide (1) in a case of IP1=IP2 and −1% fluctuation.

FIG. 19C is a diagram illustrating the current class and current class guide (2) in a case of IP1=IP2 and −2% fluctuation.

FIG. 19D is a diagram illustrating the current class and current class guide (1') in a case of IP1０IP2 and −1% fluctuation.

FIG. 19E is a diagram illustrating the current class and current class guide (2') in a case of IP1０IP2 and −2% fluctuation.

FIG. 26 is a view illustrating a configuration example of a heat dissipation mechanism on the host side corresponding to the power configuration of the current consumption class with small current consumption.

DETAILED DESCRIPTION

Various embodiments will be described hereinafter with reference to the accompanying drawings.

In general, according to one embodiment, a removable memory device is insertable into and detachable from a socket in a host and operates with first and second powers supplied from the host. The first and second powers have voltages different from each other. The removable memory device comprises a plurality of terminals including one or more first power supply terminals to which the first power is supplied and one or more second power supply terminals to which the second power is supplied, a nonvolatile memory, and a controller configured to control the nonvolatile memory. The removable memory device is configured to support one current consumption class among plural types of current consumption classes defining a plurality of current consumptions different from each other. Both a current consumption for the first power and a current consumption for the second power are defined in each of the plural types of current consumption classes. In a case where the one current consumption class supported by the removable memory device is a first current consumption class having a largest current consumption value among the plural types of current consumption classes, a first current consumption value consumed from the first power by the removable memory device is smaller than or equal to a first permissible current value that is a maximum current value permitted to be supplied from the host to the one or more first power supply terminals of the removable memory device via a contact resistance between a terminal of the socket and a terminal of the removable memory device; and a second current consumption value consumed from the second power by the removable memory device is smaller than or equal to a second permissible current value that is a maximum current value permitted to be supplied from the host to the one or more second power supply terminals of the removable memory device via the contact resistance. In a case where the current consumption class supported by the removable memory device is another current consumption class different from the first current consumption class, the first current consumption value is smaller than or equal to a third permissible current value for the first power defined in said another current consumption class; and the second current consumption value is smaller than or equal to a fourth permissible current value for the second power defined in said another current consumption class.

Figure 1A:
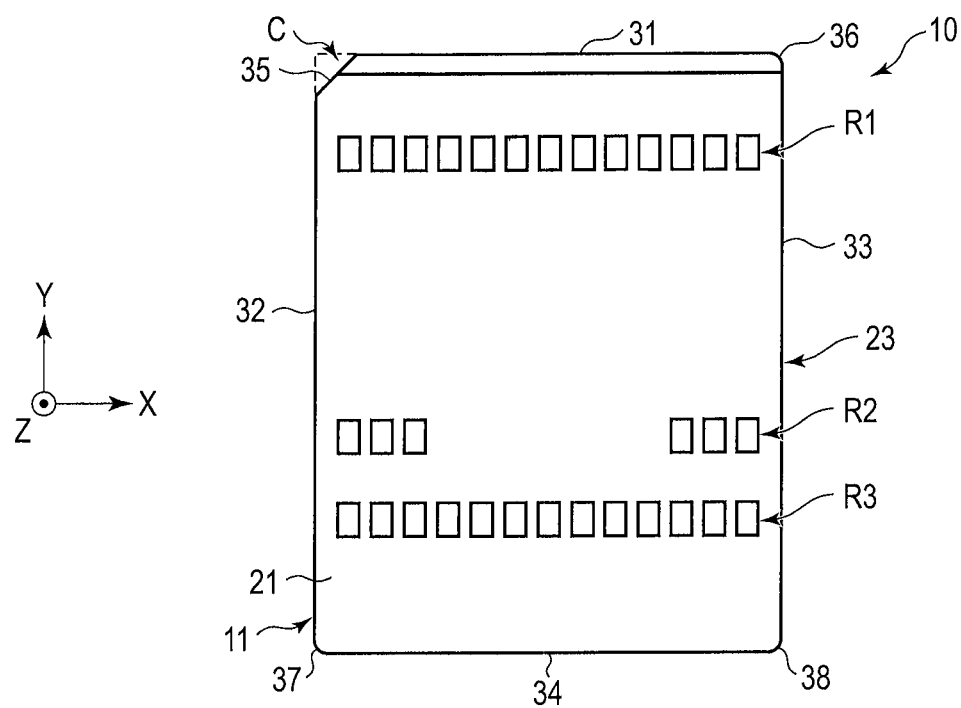
FIG. 1A is a plan view on a first surface side of a removable memory device according to an embodiment.
Figure 1B:
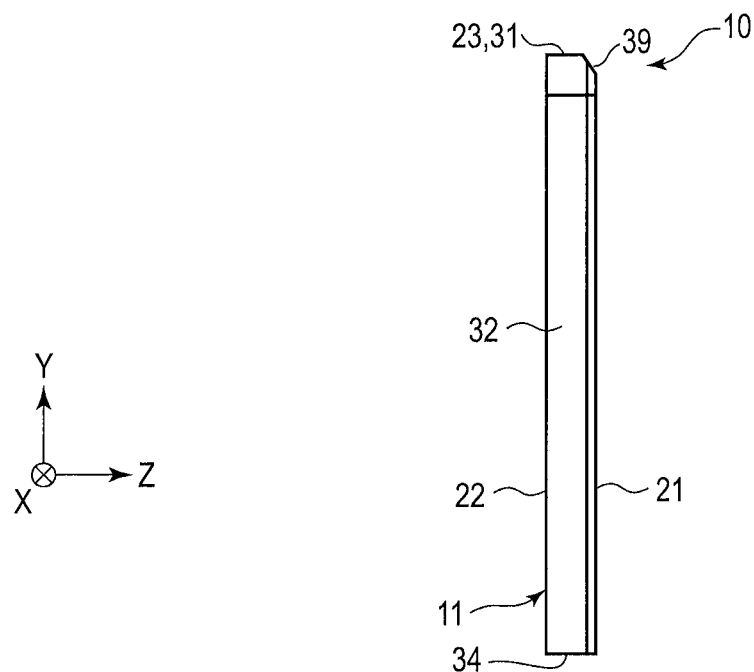
FIG. 1B is a side view of the removable memory device according to the embodiment.
Figure 1C:
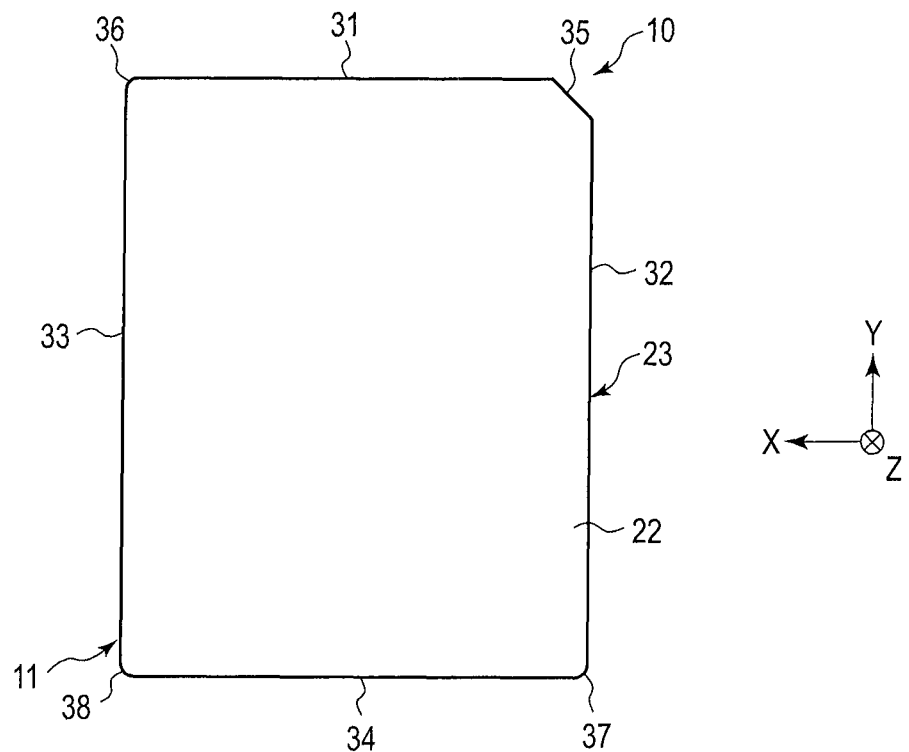
FIG. 1C is a plan view on a second surface side of the removable memory device according to the embodiment.

First, an outer shape of a removable memory device 10 according to the embodiment will be described with reference to FIG. 1A, FIG. 1B, and FIG. 1C. FIG. 1A is a plan view illustrating one of surfaces of the removable memory device 10. FIG. 1B is a side view illustrating a side surface of the removable memory device 10. FIG. 1C is a plan view illustrating another surface of the removable memory device 10.

In this specification, an X-axis, a Y-axis and a Z-axis are defined. The X-axis, the Y-axis, and the Z-axis are orthogonal to each other. The X-axis extends along a width of the removable memory device 10. The Y-axis extends along a length (height) of the removable memory device 10. The Z-axis extends along a thickness of the removable memory device 10.

The removable memory device 10 is a memory device which can be inserted into and removed from a socket in the host (host device). The removable memory device 10 is configured to operate with plural types of powers supplied from the host. The plural types of powers have voltages different from each other. Each of the plural types of powers which are supplied from the host to the removable memory device 10 or each of power supply lines for supplying the respective plural types of powers from the host to the removable memory device 10 is referred to as a power rail.

For example, when the removable memory device 10 is realized as a memory device having a power configuration that operates with two types of powers supplied from the host, a first power having a first voltage is supplied from the first power management IC in the host to the removable memory device 10 via a first power rail, and a second power having a second voltage is supplied from a second power management IC in the host to the removable memory device 10 via a second power rail.

As illustrated in FIG. 1A, the removable memory device 10 comprises a package (main body) 11 shaped in a thin plate. The main body 11 of the removable memory device 10 is, for example, formed in a substantially rectangular plate shape extending in the Y-axis direction. The Y-axis direction is the longitudinal direction of the main body 11 of the removable memory device 10.

The main body 11 is shaped in a plate and has a first surface 21, a second surface 22, and an outer edge 23. The first surface 21 and the second surface 22 are formed in an approximately square (rectangular) shape extending in the Y-axis direction. In other words, the Y-axis direction is also the longitudinal direction of the first surface 21 and the second surface 22.

The first surface 21 is an approximately plane surface facing in a positive direction of the Z-axis. The second surface 22 is an approximately plane surface which is located on a side opposite to the first surface 21 and which faces in a negative direction of the Z-axis.

The outer edge 23 is provided between the first surface 21 and the second surface 22, and connected to an edge of the first surface 21 and an edge of the second surface 22. The outer edge 23 has a first edge 31, a second edge 32, a third edge 33, a fourth edge 34, a first corner part 35, a second corner part 36, a third corner part 37, and a fourth corner part 38.

The first edge 31 extends in the X-axis direction to face in the positive direction of the Y-axis. The X-axis direction is a lateral direction of the main body 11, the first surface 21, and the second surface 22, and includes the positive direction of the X-axis and the negative direction of the X-axis.

The second edge 32 extends in the Y-axis direction to face in the negative direction of the X-axis. The third edge 33 is located on a side opposite to the second edge 32 to extend in the Y-axis direction and face in the positive direction of the X-axis. The fourth edge 34 is located on a side opposite to the first edge 31 to extend in the X-axis direction and face in the negative direction of the Y-axis.

The length of each of the second edge 32 and the third edge 33 is greater than the length of each of the first edge 31 and the fourth edge 34. The first edge 31 and the fourth edge 34 form short sides of the substantially rectangular memory device 10, and the second edge 32 and the third edge 33 form long sides (edge sides) of the substantially rectangular removable memory device 10.

The first corner part 35 is a corner part between the first edge 31 and the second edge 32 to connect an end of the first edge 31 in the negative direction of the X-axis and an end of the second edge 32 in the positive direction of the Y-axis.

The first corner part 35 extends linearly at a position between the end of the first edge 31 in the negative direction of the X-axis and the end of the second edge 32 in the positive direction of the Y-axis. A corner between the first edge 31 and the second edge 32 is set to what is called corner chamfering of C1.1 (also referred to as C chamfering), and the first corner part 35 is thereby provided. According to an alternative expression, the first corner part 35 is a corner chamfering part C formed between the first edge 31 and the second edge 32.

The second corner part 36 is a corner part between the first edge 31 and the third edge 33 to connect an end of the first edge 31 in the positive direction of the X-axis and an end of the third edge 33 in the positive direction of the Y-axis direction. The second corner part 36 extends in an arcuate shape at a position between the end of the first edge 31 in the positive direction of the X-axis and the end of the third edge 33 in the positive direction of the Y-axis. A corner between the first edge 31 and the third edge 33 is set to what is called round chamfering of R0.2 (also referred to as R chamfering), and the second corner part 36 is thereby provided. Thus, the shapes of the first corner part 35 and the second corner part 36 are different from each other.

The third corner part 37 connects the end of the second edge 32 in the negative direction of the Y-axis with the end of the fourth edge 34 in the negative direction of the X-axis. The fourth corner part 38 connects the end of the third edge 33 in the negative direction of the Y-axis with the end of the fourth edge 34 in the positive direction of the X-axis. Each of the third corner part 37 and the fourth corner part 38 extends in an arcuate shape, similarly to the second corner part 36.

In the main body 11, the first surface 21, and the second surface 22, the length in the Y-axis direction is set to approximately 18±0.10 mm, and the length in the X-axis direction is set to approximately 14±0.10 mm. In other words, a distance between the first edge 31 and the fourth edge 34 in the Y-axis direction is set to approximately 18±0.1 mm, and a distance between the second edge 32 and the third edge 33 in the X-axis direction is set to approximately 14±0.10 mm. The lengths of the main body 11, the first surface 21, and the second surface 22 in the X-axis direction and the Y-axis direction are not limited to this example.

In the main body 11 and the outer edge 23, the thickness in the Z-axis direction is set to approximately 1.4 mm±0.10 mm. In other words, a distance between the first surface 21 and the second surface 22 in the Z-axis direction is set to approximately 1.4 mm±0.10 mm. The length of the outer edge 23 in the Z-axis direction is not limited to this example.

As illustrated in FIG. 1B, the main body 11 further has an inclined part 39. The inclined part 39 is a corner part between the first surface 21 and the first edge 31, and extends linearly at a position between the end of the first surface 21 in the positive direction of the Y-axis and the end of the first edge 31 in the positive direction of the Z-axis.

As illustrated in FIG. 1A, a plurality of terminals are provided on the first surface 21 of the removable memory device 10. Each of the plurality of terminals is also referred to as an external connection terminal. In FIG. 1A, the plurality of terminals are represented by small rectangles.

The plurality of terminals are arranged in, for example, three rows, i.e., a first row R1, a second row R2, and a third row R3. A terminal group arranged in the first row R1 is referred to as a first row terminal group. The first row terminal group includes, for example, a plurality of signal terminals for transmitting and receiving differential signals for two lanes defined under PCI Express (registered trademark) (PCIe) standard. The signal terminals corresponding to one lane include two terminals to which receiver differential signal pairs are assigned and two terminals to which transmitter differential signal pairs are assigned. The two terminals to which the receiver differential signal pairs are assigned and the two terminals to which the transmitter differential signal pairs are assigned are adjacent to each other while sandwiching a ground terminal interposed between the two terminals to which the receiver differential signal pairs are assigned and the two terminals to which the transmitter differential signal pairs are assigned. In other words, any two terminals to which the differential signal pairs are assigned are surrounded by two ground terminals located on both sides of the two terminals.

The terminal group of the second row R2 is referred to as a second row terminal group. The second row terminal group includes, for example, several signal terminals for optional signals. Alternatively, the second row terminal group may include one additional power supply terminal corresponding to a three-power configuration.

The terminal group of the third row R3 is referred to as a third row terminal group. The third row terminal group includes several signal terminals to which sideband signals defined under PCIe standard (for example, reset signal PERST #, clock request signal CLKREQ #, and reference clock pair CLKREF) are assigned, one or more first power supply terminals to which the first power having the first voltage is supplied, one or more second power supply terminals to which a second power having a second voltage different from the first voltage is supplied, and several ground terminals.

Figure 2:
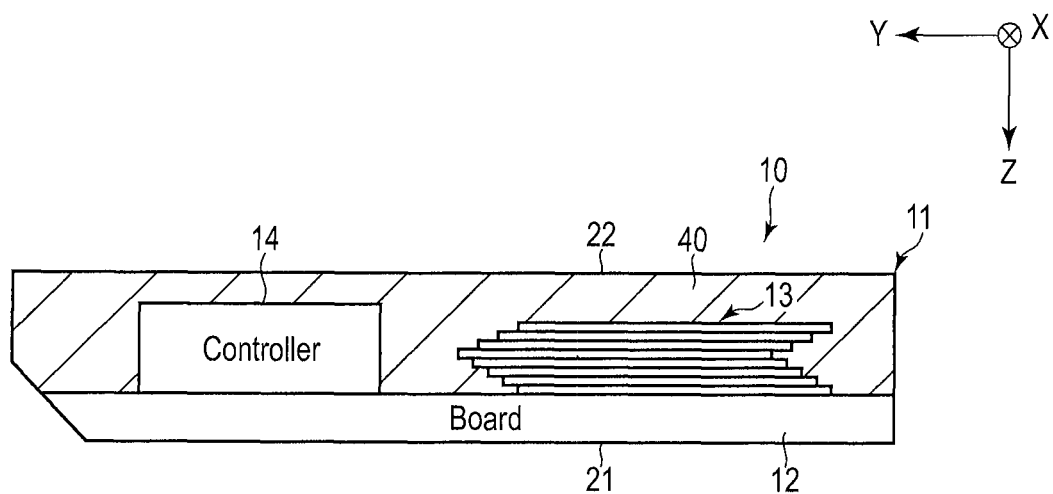
FIG. 2 is a diagram illustrating a configuration example of the removable memory device according to the embodiment.

FIG. 2 illustrates a configuration example of the removable memory device 10.

As illustrated in FIG. 2, a board 12, a NAND flash memory 13, and a controller 14 for controlling the NAND flash memory 13 are provided inside the main body 11 of the removable memory device 10. The NAND flash memory 13 and the controller 14 are mounted on a surface of the board 12. The NAND flash memory 13 includes a plurality of NAND flash memory dies stacked on the surface of the board 12.

A back surface of the substrate on a side opposite to the front surface of the board 12 is exposed and functions as the first surface 21. The plurality of terminals described with reference to FIG. 1A are arranged on the back surface of the board 12.

The NAND flash memory 13 and the controller 14 are covered and sealed with a mold resin 40 that is molded to form the body (main body 11) of the removable memory device 10.

FIG. 3 is a plan view illustrating an example of the outer shape of the removable memory device 10, and an arrangement example of the plurality of terminals.

As illustrated in FIG. 3, the removable memory device 10 includes a plurality of terminals P. The terminals P are often referred to as pads. It is exemplified in FIG. 3 that the removable memory device 10 includes 32 terminals P, but the number of terminals P is merely an example and is not limited to this example. In other words, the number of terminals P may be smaller than 32 or larger than 32. The plurality of terminals P are arranged on the back surface of the board 12 and exposed on the first surface 21. No terminals P are provided on the second surface 22. The second surface 22 can be used as, for example, a marking area.

As illustrated in FIG. 3, the first row terminal group arranged in the first row R1 includes thirteen terminals P101 to P113 spaced apart from each other and arranged in the X-axis direction, at positions closer to the first edge 31 than to the fourth edge 34. The terminals P101 to P113 are arranged in the X-axis direction along the first edge 31, at positions near the first edge 31.

The second row terminal group arranged in the second row R2 includes six terminals P114 to P119 spaced apart from each other and arranged in the X-axis direction, at positions closer to the fourth edge 34 than to the first edge 31. The terminals P114 to P116 are arranged in the X-axis direction along the fourth edge 34, at positions closer to the second edge 32 than to the third edge 33. The terminals P117 to P119 are arranged in the X-axis direction along the fourth edge 34, at positions closer to the third edge 33 than to the second edge 32. According to the other expressions, the terminals P114 to P116 are arranged between a centerline (represented by a one-dot chain line) of the removable memory device 10 and the main body 11 in the X-axis direction and the second edge 32, and the terminals P117 to P119 are arranged between a centerline of the removable memory device 10 and the main body 11 in the X-axis direction and the third edge 33. An interval between the terminal P116 and the terminal P117 that belong to the second row terminal group is wider than intervals between the other terminals that belong to the second row terminal group and that are adjacent to each other in the X-axis direction (more specifically, an interval between the terminal P114 and the terminal P115, an interval between the terminal P115 and the terminal P116, an interval between the terminal P117 and the terminal P118, and an interval between the terminal P118 and the interval P119).

The third row terminal group arranged in the third row R3 includes thirteen terminals P120 to P132 spaced apart from each other and arranged in the X-axis direction, at positions closer to the fourth edge 34 than to the first edge 31. Terminals P120 to P132 that belong to the row R3 are arranged at positions closer to the fourth edge 34 than the terminals P114 to P119 that belong to the row R2.

FIG. 4 is a plan view illustrating an outer shape of a socket 100 into which the removable memory device 10 is inserted, and an arrangement example of a plurality of lead terminals.

In the socket 100, a plurality of lead terminals 104 are arranged in three rows, i.e., row r1, row r2, and row r3 corresponding to the respective first, second and third row terminal groups of the removable memory device 10. The lead terminals are often referred to as spring leads. The removable memory device 10 is arranged on the socket 100 in FIG. 4, in a state in which the first surface 21 faces a plurality of lead terminals 104 of the socket 100.

Thirteen lead terminals 104 are arranged in the first row r1. Similarly, six lead terminals 104 are arranged in the second row r2, and thirteen lead terminals 104 are arranged in the third row r3.

Each lead terminal 104 includes a contact part 105 which is in contact with a corresponding terminal of the removable memory device 10. Each lead terminal 104 is bonded to a frame 106 of the socket 100.

The frame 106 of the socket 100 has a first edge 111, a second edge 112, a third edge 113, a fourth edge 114, and a connecting part 115. The first edge 111, the second edge 112, the third edge 113, and the fourth edge 114 correspond to four upper, lower, right, and left sides of the rectangular frame 106. The connecting part 115 connects between an intermediate part of the second edge 112 and an intermediate part of the third edge 113.

The thirteen lead terminals 104 in the first row r1 are bonded to the first edge 111 of the frame 106. The six lead terminals 104 in the second row r2 are bonded to the connecting part 115 of the frame 106. The thirteen lead terminals 104 of the third row r3 are bonded to the fourth edge 114 of the frame 106.

Figure 5:
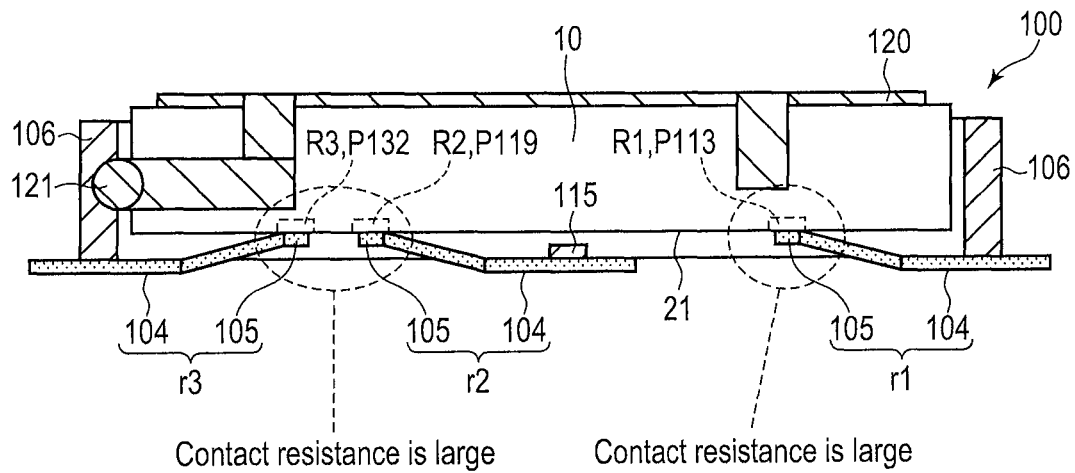
FIG. 5 is a side view illustrating a state in which the removable memory device according to the embodiment is inserted into the socket.

FIG. 5 is a side view illustrating a state in which the removable memory device 10 is inserted into the socket 100.

Various types of the socket 100, for example, a push-push type, a push-pull type, and a hinge type can be used, but the hinge type socket 100 will be described as an example.

The cover 120 is attached to the frame 106 so as to rotate around a shaft 121 which functions as a hinge. The removable storage device 10 is inserted into the cover 120 while the cover 120 is raised to the opened position. Then, when the cover 120 is closed, each of the terminals P arranged on the first surface 21 of the removable storage device 10 is brought into contact with the contact portion 105 of the corresponding lead terminal 104 in the socket 100, as illustrated in FIG. 5. Each of the terminals P arranged on the first surface 21 of the removable storage device 10 is thereby electrically connected to the lines on the printed circuit board in the host.

Thus, the removable storage device 10 is electrically connected to the printed circuit board in the host via the socket 100. Therefore, the number of terminals that can be arranged in the removable storage device 10 is reduced as compared to an embedded type memory device in which each terminal is directly soldered to a printed circuit board in the host, such as a ball grid array (BGA) type memory device. Due to such limit of the number of terminals, the number of power supply terminals per power is also limited. Therefore, the current value supplied to one power supply terminal tends to become relatively large in the removable storage device 10.

In addition, there is a contact resistance between each terminal P of the removable storage device 10 and each lead terminal 104 (contact part 105) of the socket 100. Since the terminal P and the lead terminal 104 are not bonded by soldering, the contact resistance between the terminal P and the lead terminal 104 is a relatively large value. The voltage value of the power supplied from the host to each power terminal of the removable storage device 10 is lowered by the voltage drop caused by this contact resistance. The contact resistance between the terminal P and the lead terminal 104 is also referred to as the contact resistance of the device socket.

Thus, since the voltage value supplied to each power supply terminal of the removable storage device 10 is lowered due to the voltage drop caused by the contact resistance, a margin between the voltage value supplied to each power supply terminal and the lower limit voltage value of each power necessary for operations of the removable storage device 10 tends to be relatively small.

Next, an example of the power configuration of the removable storage device 10 will be described.

First, the removable memory device 10 with a two-power configuration, i.e., the removable memory device 10 that operates with two powers will be described.

Figure 6:
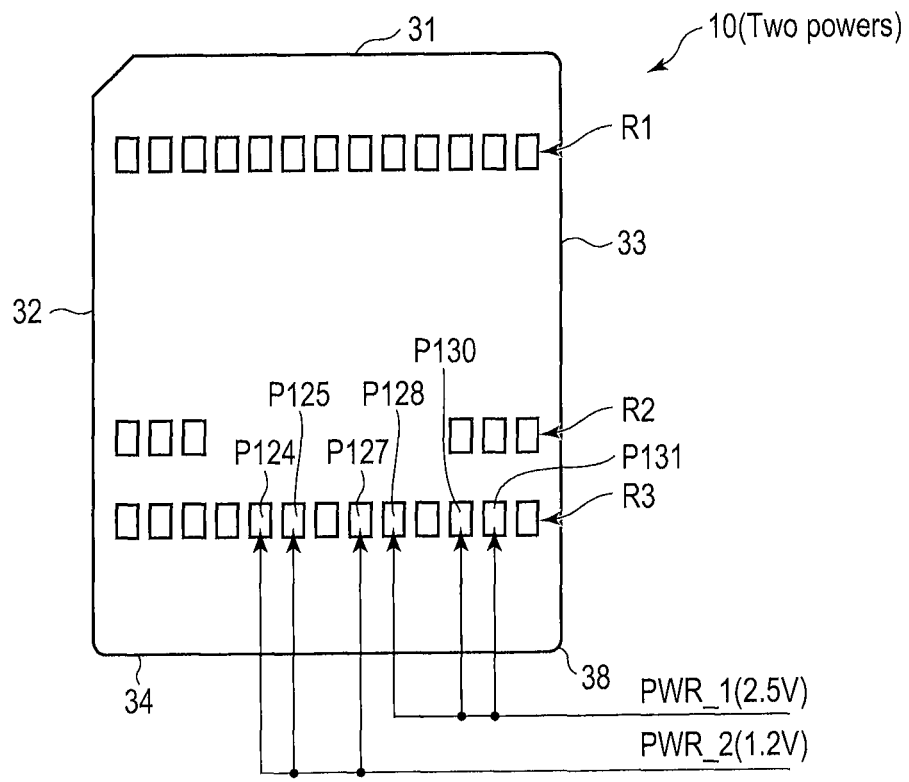
FIG. 6 is a view illustrating an arrangement example of a plurality of power supply terminals of the removable memory device according to the embodiment operating with two powers.

FIG. 6 is a view illustrating an arrangement example of a plurality of power supply terminals of the removable memory device 10 operating with two powers. FIG. 6 illustrates an example that the number of power supply terminals to which the first power is supplied is three and that the number of power supply terminals to which the second power is supplied is three. However, the number of power supply terminals to which the first power is supplied and the number of power supply terminals to which the second power is supplied are not limited to this example, but the number of power supply terminals to which the first power is supplied may be one or more and the number of power supply terminals to which the second power supply is supplied may also be one or more.

The first power (i.e., power rail PWR_1) has a voltage of, for example, 3.3V or 2.5V. A case where the first power (PWR_1) has 2.5V will be mainly described below. 2.5V is a nominal value of the voltage of the first power (PWR_1) and, in fact, the first power (PWR_1) has a voltage range corresponding to a certain rate of power supply voltage fluctuation.

The first power (PWR_1) is supplied to, for example, three terminals included in the third row terminal group, i.e., terminal P128, terminal P130, and terminal P131. The terminal P128, the terminal P130, and the terminal P131 function as power supply terminals for the first power (PWR_1).

A second power (i.e., power rail PWR_2) has a voltage of, for example, 1.2. 1.2V is a nominal value of a voltage of the second power (PWR_2) and, in fact, the second power (PWR_2) has a voltage range corresponding to a certain rate of power supply voltage fluctuation.

The second power (PWR_2) is supplied to, for example, three terminals included in the third row terminal group, i.e., terminal P124, terminal P125, and terminal P127. The terminal P124, the terminal P125, and the terminal P127 function as power supply terminals for the second power (PWR_2).

Figure 7:
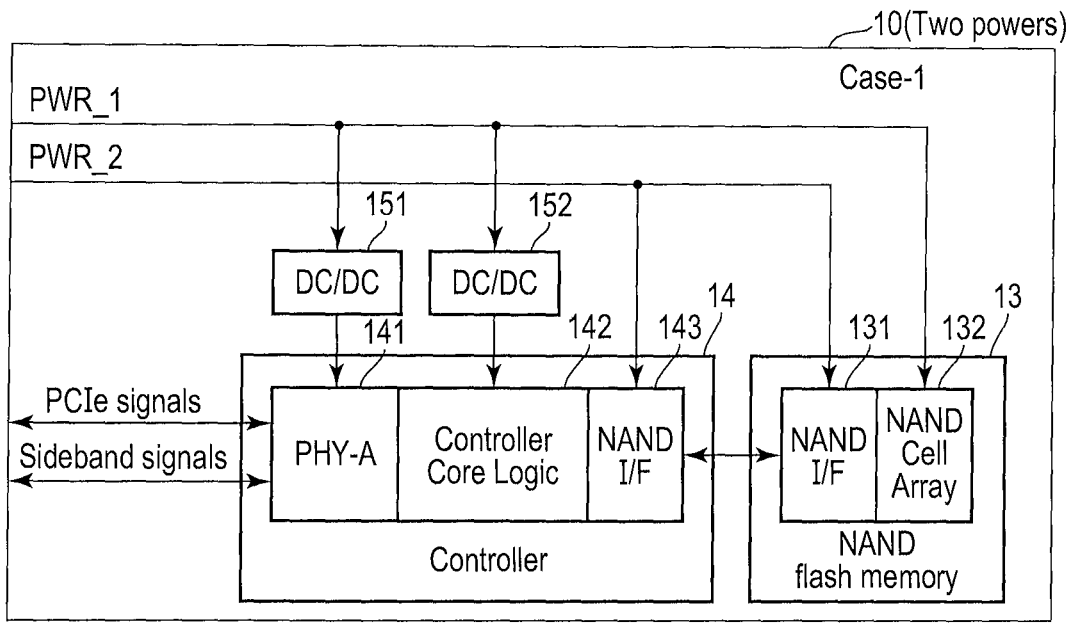
FIG. 7 is a block diagram illustrating a power configuration example of the removable memory system according to the embodiment operating with two powers.

FIG. 7 is a block diagram illustrating a power configuration example of the removable memory system 10 operating with two powers.

The NAND flash memory 13 included in the removable memory device 10 includes a NAND interface circuit 131 and a memory cell array 132 referred to as a NAND cell array.

The NAND interface circuit 131 executes an operation of receiving command sequences (a read command sequence, a write command sequence, an erase command sequence, and the like) and data from the controller 14, an operation of writing data to the NAND cell array, based on the received write command sequence, an operation of reading data from the NAND cell array, based on the received read command sequence, an operation of erasing data in block units, based on the received erase command sequence, and an operation of transmitting status and read data to the controller 14.

The memory cell array includes a plurality of blocks. Each of the plurality of blocks includes a plurality of pages. Each of the plurality of blocks is a unit of a data erase operation. Each of the plurality of pages is a unit for a data write operation and a data read operation.

The first power (PWR_1) having 2.5V is mainly used as a power for operating the memory cell array 132. The second power (PWR_2) having 1.2V is mainly used as a power for operating the NAND interface circuit 131.

The controller 14 includes a physical layer (PHY-A) 141 including analog circuits; a core logic 142; and a NAND interface circuit 143.

The physical layer (PHY-A) 141 communicates with the host via a PCIe bus. More specifically, the physical layer (PHY-A) 141 communicates with the host, using PCIe signals (two pairs of differential signals per lane) for a plurality of lanes (for example, two lanes), and executes transmission and reception of several PCIe sideband signals to and from the host.

The core logic 142 includes various logic for executing the internal operations of the controller 14. This core logic 142 executes, for example, processing for interpreting and executing commands from the host, error correction code (ECC) encoding/decoding processing, and the like.

The NAND interface circuit 143 is an interface circuit which executes communication with the NAND flash memory 13. The NAND interface circuit 143 executes an operation of transmitting the command sequences (read command sequence, write command sequence, erase command sequence, and the like) and data to the NAND flash memory 13, and an operation of receiving status and read data from the NAND flash memory 13.

In the power configuration (Case-1) of FIG. 7, the first power (PWR_1) having 2.5V is further used to produce an internal power for operating the physical layer (PHY-A) 141 and an internal power for operating the core logic 142.

A step-down converter such as a DC/DC converter or a low drop output (LDO) regulator is used. In the following descriptions, the name "DC/DC converter" will be used as a representative.

More specifically, the 2.5V first power (PWR_1) is supplied to both the DC/DC converter 151 and the DC/DC converter 152. The DC/DC converter 151 converts the 2.5V first power (PWR_1) into a predetermined voltage lower than 2.5V (for example, 1.8V), and supplies this converted predetermined voltage to the physical layer (PHY-A) 141 as an internal power for operating the physical layer (PHY-A) 141. The DC/DC converter 152 converts the 2.5V first power (PWR_1) into another predetermined voltage lower than 2.5V (for example, 0.8V), and supplies this converted predetermined voltage to the core logic 142 as an internal power for operating the core logic 142.

The current consumption value consumed from the first power (PWR_1) in the removable memory device 10 is a sum of the current consumption value of the memory cell array 132, the current consumption value of the core logic 142, and the current consumption value of the physical layer (PHY-A) 141. Therefore, the current consumption value consumed from the first power (PWR_1) in the removable memory device 10 depends on the configuration of each of these memory cell array 132, core logic 142, and physical layer (PHY-A) 141, and the performance of the removable memory device 10.

The current consumption value consumed from the second power (PWR_2) in the removable memory device 10 is a sum of the current consumption value of the NAND interface circuit 131 in the NAND flash memory 13 and the current consumption value of the NAND interface circuit 143 in the controller 14. Therefore, the current consumption value consumed from the second power (PWR_2) in the removable memory device 10 depends on the configuration of each of these NAND interface circuits 131 and 143 and the performance of the removable memory device 10.

Figure 8:
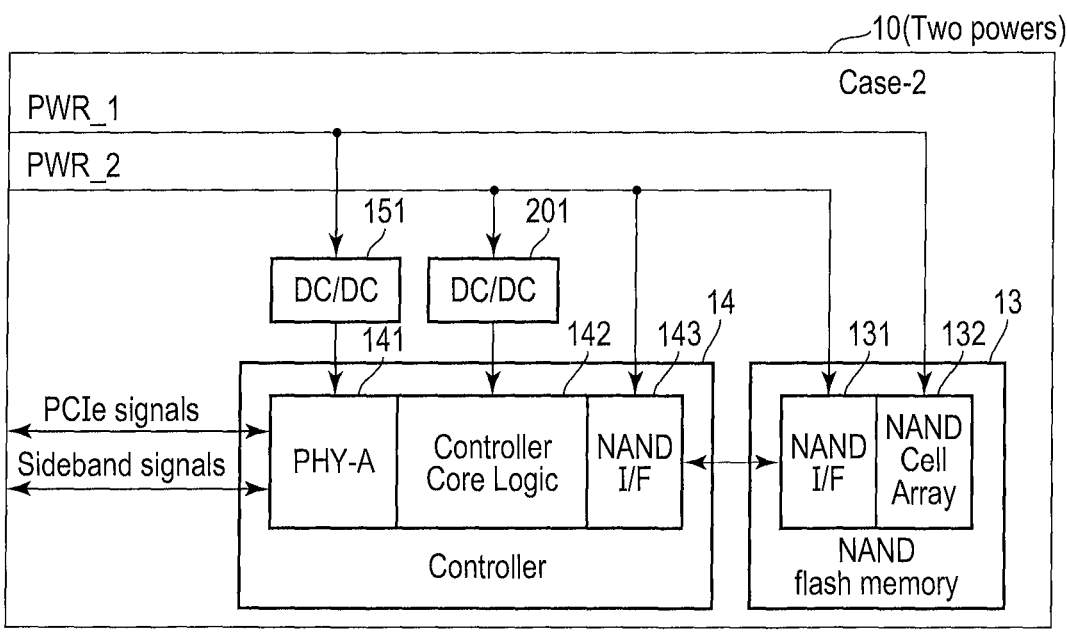
FIG. 8 is a block diagram illustrating another power configuration example of the removable memory system according to the embodiment operating with two powers.

FIG. 8 is a block diagram illustrating another power configuration example of the removable memory system 10 operating with two powers.

In the power configuration (Case-2) of FIG. 8, the internal power for operating the core logic 142 is not produced from the first power (PWR_1) of 2.5V, but from the second power (PWR_2) having 1.2V. The other points are the same as the power configuration (Case-1) in FIG. 7.

The second power (PWR_2) having 1.2V is supplied to the DC/DC converter 201. The DC/DC converter 201 converts the second power (PWR_2) of 1.2V into a predetermined voltage lower than 1.2V (for example, 0.8V), and supplies this converted predetermined voltage to the core logic 142 as an internal power for operating the core logic 142.

The current consumption value consumed from the first power (PWR_1) in the removable memory device 10 is a sum of the current consumption value of the memory cell array 132 and the current consumption value of the physical layer (PHY-A) 141. Therefore, the current consumption value consumed from the first power (PWR_1) in the removable memory device 10 depends on the configuration of each of the memory cell array 132 and the physical layer (PHY-A) 141 and the performance of the removable memory device 10.

The current consumption value consumed from the second power (PWR_2) in the removable memory device 10 is a sum of the current consumption value of the NAND interface circuit 131 in the NAND flash memory 13, the current consumption value of the NAND interface circuit 143 in the controller 14, and the current consumption value of the core logic 142. Therefore, the current consumption value consumed from the second power (PWR_2) in the removable memory device 10 depends on the configuration of each of these NAND interface circuits 131 and 143 and the core logic 142 and the performance of the removable memory device 10.

Next, the removable memory device 10 with a three-power configuration, i.e., the removable memory device 10 that operates with three powers will be described.

Figure 9:
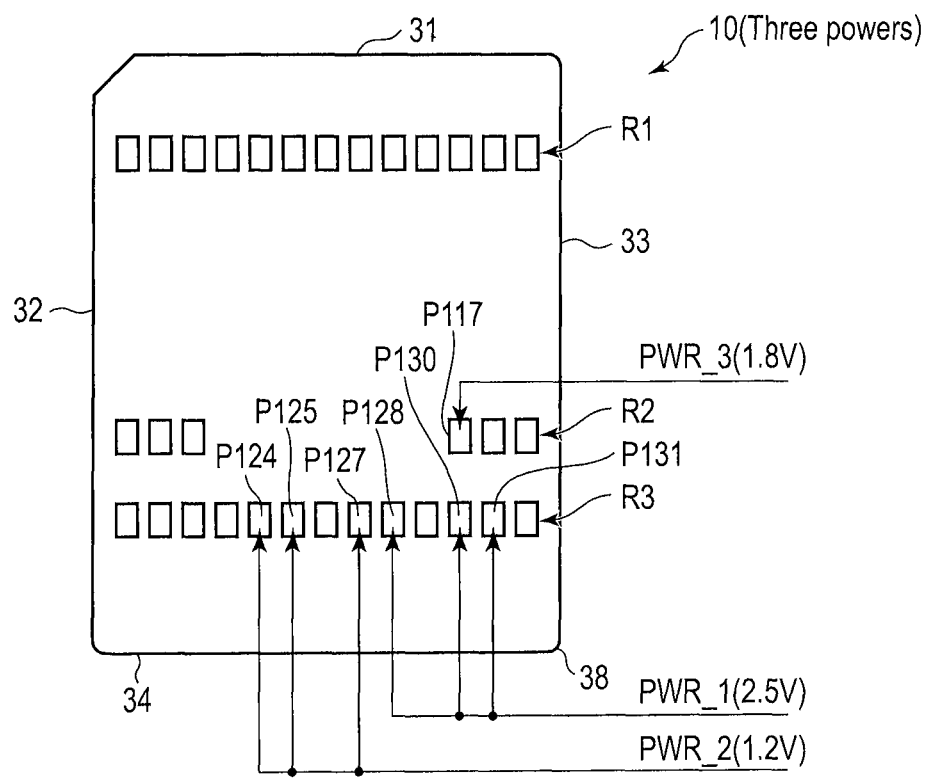
FIG. 9 is a view illustrating an arrangement example of a plurality of power supply terminals of the removable memory device according to the embodiment operating with three powers.

FIG. 9 is a view illustrating an arrangement example of a plurality of power supply terminals of the removable memory device 10 operating with three powers. FIG. 9 illustrates an example that the number of power supply terminals to which the first power is supplied is three, that the number of power supply terminals to which the second power is supplied is three, and that the number of power supply terminals to which the third power is supplied is one. However, the number of power supply terminals to which the first power is supplied, the number of power supply terminals to which the second power is supplied, and the number of power supply terminals to which the third power is supplied are not limited to this example, but the number of power supply terminals to which the first power is supplied may be one or more, the number of power supply terminals to which the second power supply is supplied may also be one or more, and the number of power supply terminals to which the third power is supplied may also be one or more.

The first power (PWR_1) having 2.5V is supplied to three terminals included in the third row terminal group, i.e., terminal P128, terminal P130, and terminal P131, similarly to the case of the two-power configuration. The second power (i.e., power rail PWR_2) having 1.2V is also supplied to three terminals included in the third row terminal group, i.e., terminal P124, terminal P125, and terminal P127, similarly to the case of the two-power configuration.

The third power (i.e., power rail PWR_3) has a voltage of, for example, 1.8V. 1.8V is a nominal value of a voltage of the third power (PWR_3) and, in fact, the third power (PWR_3) has a voltage range corresponding to a certain rate of power supply voltage fluctuation.

The third power (PWR_3) having 1.8V is supplied to, for example, one terminal included in the second row terminal group, i.e., terminal P117.

FIG. 10 is a block diagram illustrating a power configuration example of the removable memory system 10 operating with three powers.

The power configuration (Case-3) of FIG. 10 is different from the power configuration (Case-1) of FIG. 7 in that the third power (PWR_3) of 1.8V is used as an internal power for operating the physical layer (PHY-A) 141.

The current consumption value consumed from the first power (PWR_1) in the removable memory device 10 is a sum of the current consumption value of the memory cell array 132 and the current consumption value of the core logic 142. Therefore, the current consumption value consumed from the first power (PWR_1) in the removable memory device 10 depends on the configuration of each of the memory cell array 132 and the physical layer (PHY-A) 141 and the performance of the removable memory device 10.

The current consumption value consumed from the second power (PWR_2) in the removable memory device 10 is a sum of the current consumption value of the NAND interface circuit 131 in the NAND flash memory 13 and the current consumption value of the NAND interface circuit 143 in the controller 14. Therefore, the current consumption value consumed from the second power (PWR_2) in the removable memory device 10 depends on the configuration of each of these NAND interface circuits 131 and 143 and the performance of the removable memory device 10.

The current consumption value consumed from the third power (PWR_3) in the removable memory device 10 is the current consumption value of the physical layer (PHY-A) 141. The current consumption value consumed from the third power (PWR_3) in the removable memory device 10 depends on the configuration of the physical layer (PHY-A) 141 and the performance of the removable memory device 10.

FIG. 11 is a block diagram illustrating another power configuration example of the removable memory system 10 operating with three powers.

The power configuration (Case-4) of FIG. 11 is different from the power configuration (Case-2) of FIG. 8 in that the third power (PWR_3) of 1.8V is used as the internal power for operating the physical layer (PHY-A) 141.

The current consumption value consumed from the first power (PWR_1) in the removable memory device 10 is the current consumption value of the memory cell array 132. Therefore, the current consumption value consumed from the first power (PWR_1) in the removable memory device 10 depends on the configuration of the memory cell array 132 and the performance of the removable memory device 10.

The current consumption value consumed from the second power (PWR_2) in the removable memory device 10 is a sum of the current consumption value of the NAND interface circuit 131 in the NAND flash memory 13, the current consumption value of the NAND interface circuit 143 in the controller 14, and the current consumption value of the core logic 142. Therefore, the current consumption value consumed from the second power (PWR_2) in the removable memory device 10 depends on the configuration of each of these NAND interface circuits 131 and 143 and the core logic 142 and the performance of the removable memory device 10.

The current consumption value consumed from the third power (PWR_3) in the removable memory device 10 is the current consumption value of the physical layer (PHY-A) 141. The current consumption value consumed from the third power (PWR_3) in the removable memory device 10 depends on the configuration of the physical layer (PHY-A) 141 and the performance of the removable memory device 10.

FIG. 12 is a diagram illustrating four types of power configuration examples applicable to the removable memory system 10.

In Case 1, the first power (PWR_1) having 3.3V or 2.5V is used as a power for operating the memory cell array (NAND Cell) 132, the physical layer (PHY-A) 141, and the core logic 142. The second power (PWR_2) having 1.2V is used as a power for operating the NAND interface circuits 131 and 143.

In Case 2, the first power (PWR_1) having 3.3V or 2.5V is used as a power for operating the memory cell array (NAND Cell) 132 and the physical layer (PHY-A) 141. The second power (PWR_2) having 1.2V is used as a power for operating the core logic 142 and the NAND interface circuits 131 and 143.

In Case 3, the first power (PWR_1) having 3.3V or 2.5V is used as a power for operating the memory cell array (NAND Cell) 132 and the core logic 142. The second power (PWR_2) having 1.2V is used as a power for operating the NAND interface circuits 131 and 143. The third power (PWR_3) having 1.8V is used as a power for operating the physical layer (PHY-A) 141.

In Case 4, the first power (PWR_1) having 3.3V or 2.5V is used as a power for operating the memory cell array (NAND Cell) 132. The second power (PWR_2) having 1.2V is used as a power for operating the core logic 142 and the NAND interface circuits 131 and 143. The third power (PWR_3) having 1.8V is used as a power for operating the physical layer (PHY-A) 141.

Next, the current consumption class applied to the removable memory device 10 having the multiple power configuration of the present embodiment will be described.

When the mechanical and electrical specifications of the removable memory device 10 with the multiple power configuration are standardized, plural types of device products that meet the same mechanical and electrical specifications as those of the removable memory device 10 with the multiple power configuration are produced by a plurality of vendors (a plurality of device manufacturers). For this reason, current consumption regulation to ensure interconnectivity and interchangeability between the plural types of device products and the host is required.

In this case, the current consumption of each power may be different depending on the implementation of the device products. For this reason, when only one current consumption regulation is defined, only the maximum value of the current consumption of each power is specified and cannot be the optimum guideline for each of the development, design and manufacturing of the device products and the host. In addition, even when only the total power consumption of the device product is specified, the current consumption which the device product consumes from each power is unknown, and a power supply circuit with excessive capability needs to be provided on the host side, which causes unnecessary increase in the costs.

Therefore, plural types of current consumption classes with different current consumption values are defined in the present embodiment. Each of these plural types of current consumption classes defines the current consumption for each of the plural powers.

For example, as for the removable memory device 10 that operates with two powers, each of the plural types of current consumption classes defines both the current consumption related to the first power (PWR_1) and the current consumption related to the second power (PWR_2). The removable memory device 10 that operates with two powers is configured to support one of the plural types of current consumption classes.

It is assumed that, for example, one current consumption class supported by the removable memory device 10 is the first current consumption class having the largest current consumption value among the plural types of current consumption classes.

In this case, a first current consumption value consumed from the first power (PWR_1) by the removable memory device 10 is smaller than or equal to a first permissible current value that is the maximum current value permitted to be supplied from the host to the first power supply terminals (P128, P130, and P131) of the removable memory device 10 via a contact resistance between a terminal of the socket 100 and a terminal of the removable memory device 10. In other words, the first permissible current value is the maximum current defined such that the voltage value of each of the first power supply terminals does not fall below a lower limit voltage of the first power (PWR_1) necessary for the operation of the removable memory device 10 due to the voltage drop caused by the contact resistance. In addition, a second current consumption value consumed from the second power (PWR_2) by the removable memory device 10 is smaller than or equal to a second permissible current value that is the maximum current value permitted to be supplied from the host to the second power supply terminals (P124, P125, and P127) of the removable memory device 10 via the contact resistance between a terminal of the socket 100 and a terminal of the removable memory device 10. In other words, the second permissible current value is the maximum current defined such that the voltage value of each of the second power supply terminals does not fall below a lower limit voltage of the second power (PWR_2) necessary for the operation of the removable memory device 10 due to the voltage drop caused by the contact resistance.

It is assumed that the one current consumption class supported by the removable memory device 10 is the other current consumption class having a current consumption smaller than that in the first current consumption class.

In this case, the first current consumption value consumed from the first power (PWR_1) by the removable memory device 10 is smaller than or equal to a third permissible current value for the first power (PWR_1) defined in the other current consumption class, and the second current consumption value consumed from the second power (PWR_2) by the removable memory device 10 is lower than or equal to a fourth permissible current value for the second power (PWR_2) defined in the other current consumption class.

As a result, the current consumption value (maximum current consumption value) necessary for the operation of the removable memory device 10 can be determined for each power, according to which of the plural types of current consumption classes is the current consumption class supported by the removable memory device 10.

Therefore, when the current consumption class of the removable memory device 10 which is to be used in the host is the first current consumption class, the host manufacturer can adopt the power configuration that the power supply circuit capable of supplying the first and second permissible current values corresponding to the first current consumption class is mounted on the host. Any device product supporting the first current consumption class can be thereby normally used in the host corresponding to the first current consumption class.

In addition, when the current consumption class of the removable memory device 10 which is to be used in the host is the other current consumption class with less current consumption than the first current consumption class, the host manufacturer can optimize the capability of the power supply circuit on the host side for each power, based on the permissible current value corresponding to the other current consumption class, and can reduce the costs of the power supply circuit on the host side.

FIG. 13 is a diagram illustrating plural types of current consumption classes.

In the present embodiment, three or four types of current consumption classes are defined. The current consumption class is also referred to as "current class".

In the removable memory device 10 with the two-power configuration, a maximum current consumption value for the first power (PWR_1) and a maximum current consumption value for the second power (PWR_2) are defined for each current class. The maximum current consumption value is defined using the permissible current value that is the maximum current permitted to be supplied from the host to the removable memory device 10 via the contact resistance. In other words, a permissible current value is defined for each power, in each current class.

In the removable memory device 10 with the three-power configuration, a permissible current value for the first power (PWR_1), a permissible current value for the second power (PWR_2), and a permissible current value for the third power (PWR_3) are defined for each current class.

In first current class CC1, the permissible current value for the first power (PWR_1) is denoted by IP1C1, the permissible current value for the second power (PWR_2) is denoted by IP2C1, and the permissible current value for the third power (PWR_3) is denoted by IP3C1.

In second current class CC2, the permissible current value for the first power (PWR_1) is denoted by IP1C2, the permissible current value for the second power (PWR_2) is denoted by IP2C2, and the permissible current value for the third power (PWR_3) is denoted by IP3C2.

In third current class CC3, the permissible current value for the first power (PWR_1) is denoted by IP1C3, the permissible current value for the second power (PWR_2) is denoted by IP2C3, and the permissible current value for the third power (PWR_3) is denoted by IP3C3.

In fourth current class CC4, the permissible current value for the first power (PWR_1) is denoted by IP1C4, the permissible current value for the second power (PWR_2) is denoted by IP2C4, and the permissible current value for the third power (PWR_3) is denoted by IP3C4.

The current class in which the current consumption value (permissible current value) is the largest among the current classes CC1 to CC4 is the first current class CC1. The current class in which the current consumption value (permissible current value) is the second largest is the second current class CC2. The current class in which the current consumption value (permissible current value) is the third largest is the third current class CC3. The current class in which the current consumption value (permissible current value) is the smallest is the fourth current class CC4.

The permissible current value (PWR permissible current value) of each power is calculated in consideration of the rate of power supply voltage fluctuation (lower limit fluctuation rate) of each power and the contact resistance between the terminal of the removable memory device 10 and the lead terminal of the socket 100. Therefore, the current class can be represented by the following current class symbols including not only the classes (1 to 4), but also a parameter indicating the rate of power supply voltage fluctuation of the power and a parameter indicating the contact resistance.

Current Class Symbol: CC #$%

\# is indicative of a class. # is indicative of any one of 1 to 4. $ is indicative of the contact resistance. The contact resistance is generally defined for each socket product.

$ is indicative of, for example, one of 3 (=30 mΩ), 4 (=40 mΩ), 5 (=50 mΩ), 6 (=60 mΩ), 7 (=70 mΩ), and 8 (=80 mΩ).

% is indicative of the rate of power supply voltage fluctuation (lower limit fluctuation rate) of the power. The rate of power supply voltage fluctuation (lower limit fluctuation rate) is determined by the performance of a power supply circuit (power management IC: PMIC) provided in the host. % is indicative of, for example, one of 1 (−1% fluctuation) and 2 (−2% fluctuation).

As regards the first current class CC1, the permissible current value IP1C1 for the first power (PWR_1) is expressed by the following formula.

$$IP1C1 = PWR\_1 \text{permissible current value} \times N$$

The PWR_1 permissible current value is indicative of the permissible current value of the first power (PWR_1) per terminal. The PWR_1 permissible current value is the maximum current defined such that the voltage value of the first power supply terminal does not fall below the lower limit voltage value of the first power (PWR_1) required for the operation of the removable memory device 10 due to the voltage drop caused by the contact resistance of the device socket. N is indicative of the number of first power supply terminals to which the first power (PWR_1) is supplied. Six PWR_1 permissible current values that correspond to six types of contact resistances, respectively, are obtained for each of −1% fluctuation and −2% fluctuation.

As regards the first current class CC1, the permissible current value IP2C1 for the second power (PWR_2) is expressed by the following formula.

$$IP2C1 = PWR\_2 \text{permissible current value} \times M$$

The PWR_2 permissible current value is indicative of the permissible current value of the second power (PWR_2) per terminal. The PWR_2 permissible current value is the maximum current defined such that the voltage value of the second power supply terminal does not fall below the lower limit voltage value of the second power (PWR_2) required for the operation of the removable memory device 10 due to the voltage drop caused by the contact resistance of the device socket. M is indicative of the number of second power supply terminals to which the second power (PWR_2) is supplied. Six PWR_2 permissible current values that correspond to six types of contact resistances, respectively, are obtained for each of −1% fluctuation and −2% fluctuation.

As regards the first current class CC1, the permissible current value IP3C1 for the third power (PWR_3) is expressed by the following formula.

$$IP3C1 = PWR\_3 \text{permissible current value} \times L$$

The PWR_3 permissible current value is indicative of the permissible current value of the third power (PWR_3) per terminal. The PWR_3 permissible current value is the maximum current defined such that the voltage value of the third power supply terminal does not fall below the lower limit voltage value of the third power (PWR_3) required for the operation of the removable memory device 10 due to the voltage drop caused by the contact resistance of the device socket. L is indicative of the number of third power supply terminals to which the third power (PWR_3) is supplied. Six PWR_3 permissible current values that correspond to six types of contact resistances, respectively, are obtained for each of −1% fluctuation and −2% fluctuation.

Thus, in the present embodiment, as regards the current class CC1, six types of permissible current values IP1 (six types of IP1C1) corresponding to six types of contact resistances and six types of permissible current values IP2 (six types of IP2C1) corresponding to six types of contact resistances are defined for each of −1% fluctuation and −2% fluctuation. Similarly, as regards each of the current classes CC2 to CC4, six types of permissible current values IP1 corresponding to six types of contact resistances and six types of permissible current values IP2 corresponding to six types of contact resistances are defined for each of −1% fluctuation and −2% fluctuation.

As regards current class CC1, the six types of permissible current values IP1 corresponding to the six types of contact resistances are calculated based on the nominal voltage value (2.5V) of the first power (PWR_1), the rate of power supply voltage fluctuation of the first power (PWR_1), the lower limit voltage value (for example, 2.4V) of the first power (PWR_1) necessary for the operation of the removable memory device 10, and six types of contact resistances. The six types of permissible current values IP1 are calculated for each of −1% fluctuation and −2% fluctuation. Details of calculation examples of six types of permissible current values IP1 for each of −1% fluctuation and −2% fluctuation will be described later with reference to FIG. 16.

Similarly, as regards current class CC1, the six types of permissible current values IP2 corresponding to the six types of contact resistances are calculated based on the nominal voltage value (1.2V) of the second power (PWR_2), the rate of power supply voltage fluctuation of the second power (PWR_2), the lower limit voltage value (for example, 1.14V) of the second power (PWR_2) necessary for the operation of the removable memory device 10, and six types of contact resistances. The six types of permissible current values IP2 are calculated for each of −1% fluctuation and −2% fluctuation.

As regards current class CC2, the permissible current value IP1 corresponding to any one contact resistance among the six types of contact resistances is defined as the minimum value of the following (1) and (2).
(1) IP1 corresponding to this contact resistance defined in CC1, and
(2) A value obtained by multiplying the maximum IP1 among the six types of IP1 defined in CC1 by a ratio (%) assigned to CC2.

Where, IP1 corresponding to this contact resistance defined in CC1, is a value obtained by multiplying the PWR_1 permissible current value corresponding to this contact resistance by the number (N) of the first power supply terminals. In addition, the maximum IP1 is a value obtained by multiplying the maximum value (IP1C1max) of the six types of PWR_1 permissible current values defined in CC1 by the number (N) of the first power supply terminals.

Above-described ratio is also referred to as the permissible current consumption reduction rate or CC current ratio.

As regards current class CC2, the permissible current value IP2 corresponding to any one contact resistance among the six types of contact resistances is defined as the minimum value of the following (3) and (4).

(3) IP2 corresponding to this contact resistance defined in CC1, and
(4) A value obtained by multiplying the maximum IP2 among the six types of IP2 defined in CC1 by the above-described ratio (%) assigned to CC2.

As regards current class CC3, the permissible current value IP1 corresponding to any one contact resistance among the six types of contact resistances is defined as the minimum value of the following (1) and (2).
(1) IP1 corresponding to this contact resistance defined in CC1, and
(2) A value obtained by multiplying the maximum IP1 among the six types of IP1 defined in CC1 by a ratio (%) assigned to CC3.

The ratio (%) assigned to CC3 is set to a value smaller than the ratio (%) assigned to CC2.

As regards current class CC3, the permissible current value IP2 corresponding to any one contact resistance among the six types of contact resistances is defined as the minimum value of the following (3) and (4).
(3) IP2 corresponding to this contact resistance defined in CC1, and
(4) A value obtained by multiplying the maximum IP2 among the six types of IP2 defined in CC1 by the above-described ratio (%) assigned to CC3.

As regards current class CC4, the permissible current value IP1 corresponding to any one contact resistance among the six types of contact resistances is defined as the minimum value of the following (1) and (2).
(1) IP1 corresponding to this contact resistance defined in CC1, and
(2) A value obtained by multiplying the maximum IP1 among the six types of IP1 defined in CC1 by a ratio (%) assigned to CC4.

The ratio (%) assigned to CC4 is set to a value smaller than the ratio (%) assigned to CC3.

As regards current class CC4, the permissible current value IP2 corresponding to any one contact resistance among the six types of contact resistances is defined as the minimum value of the following (3) and (4).
(3) IP2 corresponding to this contact resistance defined in CC1, and
(4) A value obtained by multiplying the maximum IP2 among the six types of IP2 defined in CC1 by the above-described ratio (%) assigned to CC4.

FIG. 14 is a diagram illustrating current consumption (permissible current) calculation formulas and permissible current reduction rates corresponding to current classes CC2 to CC4.

The permissible current value IP1 of the first power (PWR_1) is obtained by the following formula.

$$IP1 = \text{MIN}[IP1C1, IP1C1\ \text{max} \times N \times \text{ratio}]$$

In other words, IP1 is IP1=IP1C1 when IP1C1 is smaller than or equal to IP1C1max×N×ratio, and IP1 is IP1=IP1C1max×N×ratio when IP1C1 is greater than IP1C1max×N×ratio.

Where, IP1C1max is indicative of the maximum value among the six types of PWR_1 permissible current values defined in CC1. The PWR_1 permissible current value in a case where the contact resistance=30 mΩ is used as IP1C1max. N is indicative of the number of first power supply terminals. Therefore, IP1C1max×N is indicative of the maximum IP1 among the six types of IP1 (IP1C1) defined in CC1.

The permissible current value IP2 of the second power (PWR_2) is obtained by the following formula.

$$IP2 = \text{MIN}[IP2C1, IP2C1\text{ max} \times M \times \text{ratio}]$$

Where, IP2C1max is indicative of the maximum value among the six types of PWR_2 permissible current values defined in CC1. The PWR_2 permissible current value in a case where the contact resistance=30 mΩ is used as IP2C1max. M is indicative of the number of second power supply terminals. Therefore, IP2C1max×M is indicative of the maximum IP2 among the six types of IP2 (IP2C1) defined in CC1.

The permissible current value IP3 of the third power (PWR_3) is obtained by the following formula.

$$IP3 = \text{MIN}[IP3C1, IP3C1\text{ max} \times L \times \text{ratio}]$$

Where, IP3C1max is indicative of the maximum value among the six types of PWR_3 permissible current values defined in CC1. The PWR_3 permissible current value in a case where the contact resistance=30 mΩ is used as IP3C1max. L is indicative of the number of third power supply terminals. Therefore, IP3C1max×L is indicative of the maximum IP3 among the six types of IP3 (IP3C1) defined in CC1.

The "ratio" in FIG. 14 is indicative of a predetermined ratio (permissible current reduction rate). In the present embodiment, the "ratio" assigned to CC2 is, for example, 72%. The "ratio" assigned to CC3 is, for example, 56%. The "ratio" assigned to CC4 is, for example, 47%.

In each of current classes CC2 to CC4, Case 1 in which IP1=IP2 and Case 2 in which IP1≠IP2 can be used.

In Case 1, six types of IP2 corresponding to six types of contact resistances are substituted for six types of IP1 corresponding to six types of contact resistances, respectively. Therefore, when IP2 corresponding to a certain contact resistance is smaller than IP1 corresponding to this contact resistance, the value of IP2 corresponding to this contact resistance is used as the value of IP1 corresponding to this contact resistance.

In Case 2, six types of IP1 corresponding to six types of contact resistances and six types of IP2 corresponding to six types of contact resistances are calculated individually, and the process of substituting IP2 corresponding to each of contact resistances for IP1 corresponding to each of the contact resistances is not executed.

Next, a calculation example of the PWR permissible current values will be described. FIG. 15 is a diagram illustrating an example of the current consumption calculation formula and an example of the permissible current reduction rate defined for each power supply in each current class.

It is assumed that the PWR maximum current value per terminal is 1.2 A. The PWR maximum current value per terminal is indicative of the maximum current value that can be supplied to one power supply terminal of the removable memory device 10 when the contact resistance and the rate of power supply voltage fluctuation of each power are not considered. In other words, the PWR maximum current value per terminal is the maximum current value that can be made to flow from the host to one lead terminal of the socket 100.

In addition, it is assumed that the number of first power supply terminals to which the first power (PWR_1) is supplied is three, that the number of second power supply terminals to which the second power (PWR_2) is supplied is three, and that the number of third power supply terminals to which the third power (PWR_3) is supplied is one.

The permissible current value IP1C1 of the first power (PWR_1) in current class CC1 is obtained by $$IP1C1 = PWR\_1\text{permissible current value} \times 3.$$

As described above, the PWR_1 permissible current value is the maximum current defined such that the voltage value of the first power supply terminal does not fall below the lower limit voltage value of the first power (PWR_1) required for the operation of the removable memory device 10 due to the voltage drop caused by the contact resistance.

The permissible current value IP2C1 of the second power (PWR_2) in current class CC1 is obtained by $$IP2C1 = PWR\_2\text{permissible current value} \times 3.$$

As described above, the PWR_2 permissible current value is the maximum current defined such that the voltage value of the second power supply terminal does not fall below the lower limit voltage value of the second power (PWR_1) required for the operation of the removable memory device 10 due to the voltage drop caused by the contact resistance.

The permissible current value IP3C1 of the third power (PWR_3) in current class CC1 is obtained by $$IP3C1 = PWR\_3\text{permissible current value} \times 1.$$

As described above, the PWR_3 permissible current value is the maximum current defined such that the voltage value of the third power supply terminal does not fall below the lower limit voltage value of the third power (PWR_3) required for the operation of the removable memory device 10 due to the voltage drop caused by the contact resistance.

For each of the PWR_1 permissible current value, the PWR_2 permissible current value, and the PWR_3 permissible current value, there is a restriction condition that PWR permissible current value PWR maximum current value (for example 1.2 A). In other words, when the contact resistance is small, the voltage drop due to the contact resistance is small, and the PWR permissible current value that can guarantee that the voltage value of the power supply terminal does not fall below the lower limit voltage value thereby increases. However, the maximum value of this PWR permissible current value is limited to the PWR maximum current value (for example, 1.2 A). The maximum value among the six types of PWR_1 permissible current values corresponding to the six types of contact resistances defined in CC1 corresponds to the PWR_1 permissible current value in the case where the contact resistance is 30 mΩ. This maximum value among the six types of PWR_1 permissible current values corresponding to the six types of contact resistances defined in CC1 is limited to 1.2 A. In other words, the maximum IP1 among the six types of IP1 corresponding to the six types of contact resistances defined in CC1 is limited to 3.6 A (=3×1.2 A). Similarly, the maximum value among the six types of PWR_2 permissible current values corresponding to the six types of contact resistances defined in CC1 corresponds to the PWR_2 permissible current value in the case where the contact resistance is 30 mΩ. This maximum value among the six types of PWR_2 permissible current values corresponding to the six types of contact resistances defined in CC1 is limited to 1.2 A. In other words, the maximum IP2 among the six types of IP2 defined in CC1 is limited to 3.6 A (=3×1.2 A).

Next, the permissible current value of each power in current class CC2 will be described. In current class CC2, for example, 72%, is used as the permissible current reduction rate.

The permissible current value IP1C2 of the first power (PWR_1) in current class CC2 is obtained by $$IP1C2=\text{MIN}[IP1C1, IP1C1\text{ max} \times 3 \times 72\%].$$

IP1C1max is the maximum value among the six types of PWR_1 permissible current values corresponding to the six types of contact resistances defined in CC1. IP1C1max is indicative of the PWR_1 permissible current value in a case where the contact resistance=30 mΩ, i.e., the PWR_1 permissible current value in a case where "CC13%".

The permissible current value IP2C2 of the second power (PWR_2) in current class CC2 is obtained by $$IP2C2=\text{MIN}[IP2C1, IP2C1\text{ max} \times 3 \times 72\%].$$

IP2C1max is the maximum value among the six types of PWR_2 permissible current values corresponding to the six types of contact resistances defined in CC1. IP2C1max corresponds to the PWR_2 permissible current value in a case where the contact resistance=30 mΩ. In a case where the PWR_1 permissible current value=1.2 A when the contact resistance=30 mΩ and the PWR_2 permissible current value=1.2 A when the contact resistance=30 mΩ, IP2C1max is equal to the PWR_1 permissible current value when "CC13%".

The permissible current value IP3C2 of the third power (PWR_3) in current class CC2 is obtained by $$IP3C2=\text{MIN}[IP3C1, IP3C1\text{ max} \times 1 \times 72\%].$$

IP3C1max is the maximum value among the six types of PWR_3 permissible current values corresponding to the six types of contact resistances defined in CC1. IP3C1max corresponds to the PWR_3 permissible current value in a case where the contact resistance=30 mΩ. In a case where the PWR_1 permissible current value=1.2 A when the contact resistance=30 mΩ and the PWR_3 permissible current value=1.2 A when the contact resistance=30 mΩ, IP3C1max is equal to the PWR_1 permissible current value when "CC13%".

IP1C3, IP2C3, and IP3C3 in current class CC3, and IP1C4, IP2C4, and IP3C4 in current class CC4 are calculated similarly to current class CC2. In the calculation of the permissible current value of each power in current class CC3, for example, 56% is used as the permissible current reduction rate. In addition, in the calculation of the permissible current value of each power in current class CC4, for example, 47% is used as the permissible current reduction rate.

FIG. 16 is a diagram illustrating an example of PWR_1 permissible current values in current class CC1.

In FIG. 16, it is assumed that Vps=2.50V and Vd_min=2.40V. Vps is the nominal voltage value (nominal) of the first power (PWR_1). Vd_min is indicative of the lower limit voltage value of the first power (PWR_1) required for the operation of the removable memory device 10.

For example, in a case where the contact resistance is 60 mΩ and the fluctuation rate of the first power (PWR_1) is −2% fluctuation, the PWR_1 permissible current value is calculated by the following formula.

$$PWR\_1\text{permissible current}=(2.5\text{ V}-0.05\text{ V}(2\%\text{ drop})-2.4\text{ V}(Vd\_\text{min}))/60\text{ m}\Omega=0.83\text{ A}$$

The permissible current value IP1C1 for the first power (PWR_1) is calculated by the following formula.

$$IP1C1=0.83\times3=2.5\text{ A}$$

Similarly, in a case where the contact resistance is 60 mΩ and the fluctuation rate of the first power (PWR_1) is −1% fluctuation, the PWR_1 permissible current value is calculated by the following formula.

$$PWR\_1\text{permissible current}=(2.5\text{ V}-0.025\text{ V}(1\%\text{ drop})-2.4\text{ V}(Vd\_\text{min}))/60\text{ m}\Omega=1.25\text{ A}$$

In this case, the PWR_1 permissible current is defined as 1.20 A by the restriction that the PWR_1 permissible current is 1.20 A at maximum. Therefore, the permissible current value IP1C1 for the first power (PWR_1) is 3.6 A.

FIG. 17 is a diagram illustrating an example of PWR_2 permissible current values in current class CC1.

In FIG. 17, it is assumed that Vps=1.20V and Vd_min=1.14V. Vps is the nominal voltage value (nominal) of the second power (PWR_2). Vd_min is indicative of the lower limit voltage value of the second power (PWR_2) required for the operation of the removable memory device 10.

For example, in a case where the contact resistance is 60 mΩ and the fluctuation rate of the first power (PWR_2) is −2% fluctuation, the PWR_2 permissible current value is calculated by the following formula.

$$PWR\_2(\text{permissible current})=(1.20\text{ V}-0.024\text{ V}(2\%\text{ drop})-1.14\text{ V}(Vd\_\text{min}))/60\text{ m}\Omega=0.60\text{ A}$$

The permissible current value IP2C1 for the second power (PWR_2) is calculated by the following formula.

$$IP2C1=0.60\times3=1.80\text{ A}$$

FIG. 18 is a diagram illustrating a permissible current ratio to CC1max and the permissible current of each power for each of four types of current classes CC1 to CC4.

CC1max is the maximum value of the permissible current value of each power in current class CC1. The permissible current ratio in current class CC1 is 100%, the permissible current ratio in current class CC2 is 72%, the permissible current ratio in current class CC3 is 56%, and the permissible current ratio in current class CC4 is 47%.

When the permissible current value IP1 of the first power (PWR_1) in current class CC1 is 3.6 A, the permissible current value IP1 in current class CC2 is 2.6 A, the permissible current value IP1 in current class CC3 is 2.0 A, and the permissible current value IP1 in current class CC4 is 1.7 A. When the permissible current value IP2 of the second power (PWR_1) in current class CC1 is 3.6 A, the permissible current value IP2 in current class CC2 is 2.6 A, the permissible current value IP2 in current class CC3 is 2.0 A, and the permissible current value IP2 in current class CC4 is 1.7 A.

In this manner, in each of the plurality of classes, the plural types of permissible current values corresponding to the plural types of contact resistances are defined as the current consumption for the first power (PWR_1), and the plural types of permissible current values corresponding to the plural types of contact resistances are defined as the current consumption for the second power (PWR_2).

It is assumed that one current class supported by the removable memory device 10 is CC1 and that the contact resistance between a terminal of the socket 100 and a terminal of the removable memory device 10 is a specific one of the plural types of contact resistances.

In this case, the first current consumption value consumed from the first power (PWR_1) by the removable memory device 10 is less than or equal to IP1 corresponding to this specific contact resistance defined by CC1, i.e., less than or equal to the first permissible current value obtained based on the nominal voltage value (2.5V) of the first power (PWR_1), the rate of power supply voltage fluctuation of the first power (PWR_1), this specific contact resistance, and the lower limit voltage value (for example, 2.4V) of the first power (PWR_1) necessary for the operations of the removable memory device 10. In addition, the second current consumption value consumed from the second power (PWR_2) by the removable memory device is less than or equal to IP2 corresponding to this specific contact resistance defined by CC1, i.e., less than or equal to the second permissible current value obtained based on the nominal voltage value (1.2V) of the second power (PWR_2), the rate of power supply voltage fluctuation of the second power (PWR_2), this specific contact resistance, and the lower limit voltage value of the second power (PWR_2) necessary for the operations of the removable memory device 10.

It is assumed that the current class supported by the removable memory device 10 is one current class of CC2 to CC4 and that the contact resistance between the terminal of the terminal of the socket 100 and the terminal of the removable memory device 10 is this specific contact resistance.

In this case, the first current consumption value consumed from the first power (PWR_1) by the removable memory device 10 is less than or equal to the smallest value of, (1) IP1 corresponding to this specific contact resistance defined in CC1 (i.e. the above-described first permissible current value), and (2) a value obtained by multiplying the maximum permissible current value (IP1C1max) among the plural types of permissible current values related to the first power (PWR_1) defined in CC1 by a ratio assigned to this one current class. In addition, the second current consumption value consumed from the second power (PWR_1) by the removable memory device 10 is less than or equal to the smallest value of, (3) IP2 corresponding to this specific contact resistance defined in CC1 (i.e. the above-described second permissible current value), and (4) a value obtained by multiplying the maximum permissible current value (IP2C1max) among the plural types of permissible current values related to the second power (PWR_2) defined in CC1 by a ratio assigned to this one current class.

Next, the current consumption class guide used in the present embodiment will be described.

When six types of contact resistances (30 mΩ, 40 mΩ, 50 mΩ, 60 mΩ, 70 mΩ, and 80 mΩ) and two types of rates of power supply voltage fluctuation (−1% fluctuation and −2% fluctuation) are combined into four types of current classes CC1 to CC4, twelve classifications exist per current class. Therefore, the total number of categories that can be classified by CCG #$% (#: 1 to 4, $: 3 to 8, and %: 1 to 2) is forty-eight.

CCG #$% is useful as information for identifying the removable memory device 10, but a current consumption class guide can be used in order to enable the removable memory device 10 to be identified more easily.

The current consumption class guide is also referred to as a current class guide CCG. The current class guide CCG defines plural categories (CCG categories) different in the combination of current consumption and performance. For example, a data transfer rate may be used as an index indicative of performance.

FIG. 19A is a diagram illustrating a current consumption class guide list indicative of the permissible current value of each power and the device performance for each current class guide category.

FIG. 19A illustrates an example in which for example, four categories, i.e., CCG-A, CCG-B, CCG-C, and CCG-D are defined in the current class guide CCG. In each of CCG-A, CCG-B, CCG-C, and CCG-D, the current range corresponding to IP1, the current range corresponding to IP2, and the performance are defined.

In CCG-A, the current range corresponding to IP1 is 2.6 A<current range≤3.6 A. The current range corresponding to IP2 is also 2.6 A<current range≤3.6 A. The performance is 4 to 8 GB/s.

In CCG-B, the current range corresponding to IP1 is 2.0 A<current range≤2.6 A. The current range corresponding to IP2 is also 2.0 A<current range≤2.6 A. The performance is 2 to 5 GB/s.

In CCG-C, the current range corresponding to IP1 is 1.7 A<current range≤2.0 A. The current range corresponding to IP2 is also 1.7 A<current range≤2.0 A. The performance is 1 to 3 GB/s.

In CCG-D, the current range corresponding to IP1 is less than 1.7 A. The current range corresponding to IP2 is also less than 1.7 A. The performance is less than 23 GB/s.

Forty-eight current class classifications represented by CCG #$% (If: 1 to 4, $: 3 to 8, %: 1 to 2) are classified into several categories using the current class guide CCG. For example, the forty-eight current class classifications are classified into eight categories, i.e., CCG-A(1), CCG-A(2), CCG-B(1), CCG-B(2), CCG-C(1), CCG-C(2), CCG-D(1), and CCG-D(2).

The classification condition is to satisfy the following (1) or (2).
(1) Both IP1 and IP2 fall within the current ranges of FIG. 19A.
(2) Either of IP1 and IP2 falls within the current range of FIG. 19A, and the other is a current value less than or equal to the current range.

For example, when both IP1 and IP2 of a certain current class classification fall within the current range corresponding to CCG-A, the category of this current class classification is CCG-A(1). In addition, when either of IP1 and IP2 of a certain current class classification falls within the current range corresponding to CCG-A and the other is a current value less than or equal to the current range corresponding to CCG-A, this current classification category is CCG-A(2).

When a condition that the minimum value (=MIN [IP1, IP2]) of IP1 and IP2 of a certain current class classification exceeds the upper limit current value of a certain current range is satisfied (CCG<IP), the category corresponding to this current range may be determined as the category of this current class classification. For example, when the minimum value (=MIN [IP1, IP2]) of IP1 and IP2 in a certain current class classification exceeds the upper limit current value of the current range corresponding to CCG-B, the category of this current class classification is CCG-B.

Next, the current class and current class guide (1) in a case where IP1=IP2 and −1% fluctuation, the current class and current class guide (2) in a case where IP1=IP2 and −2% fluctuation, the current class and current class guide (1') in a case where IP1○IP2 and −1% fluctuation, and the current class and current class guide (2') in a case where IP1○IP2 and −2% fluctuation will be described.

FIG. 19B is a diagram illustrating the current class and current class guide (1). FIG. 19C is a diagram illustrating the current class and current class guide (2). FIG. 19C is a diagram illustrating the current class and current class guide (1'). FIG. 19D is a table illustrating the current class and current class guide (2').

In the current class and current class guide (1), the table of CC1 is divided into CC0 (maximum permissible current table) and CC1 (1%) (table illustrating current values rounded to one decimal place and CCG). In the table of CC1 (1%), an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances. In each of the table of CC2 (1%) to the table of CC4 (1%), too, an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances.

The six types of IP1 in the table of CC1 (1%) are calculated based on the nominal voltage value (2.5V) of the first power (PWR_1), the rate of power supply voltage fluctuation (−1%) of the first power (PWR_1), the lower limit voltage value (for example, 2.4V) of the first power (PWR_1) necessary for the operation of the removable memory device 10, and six types of contact resistances. The six types of IP2 in the table of CC1 (1%) are calculated based on the nominal voltage value (1.2V) of the second power (PWR_2), the rate of power supply voltage fluctuation (−1%) of the second power (PWR_2), the lower limit voltage value (for example, 1.14V) of the second power (PWR_2) necessary for the operation of the removable memory device 10, and six types of contact resistances.

In each of the table of CC2 (1%) to the table of CC4 (1%), the six types of IP2 are calculated based on the formula IP2=MIN [IP2C1, IP2C1max×M×ratio] described with reference to FIG. 15. The six types of IP1 are calculated such that IP1=IP2.

In the current class and current class guide (2) of FIG. 19C, too, the table of CC1 is divided into CC0 (maximum permissible current table) and CC1 (2%) (table illustrating current values rounded to one decimal place and CCG). In the table of CC1 (2%), an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances. In each of the table of CC2 (2%) to the table of CC4 (2%), too, an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances.

The six types of IP1 in the table of CC1 (2%) are calculated based on the nominal voltage value (2.5V) of the first power (PWR_1), the rate of power supply voltage fluctuation (−2%) of the first power (PWR_1), the lower limit voltage value (for example, 2.4V) of the first power (PWR_1) necessary for the operation of the removable memory device 10, and six types of contact resistances. The six types of IP2 in the table of CC1 (2%) are calculated based on the nominal voltage value (1.2V) of the second power (PWR_2), the rate of power supply voltage fluctuation (−2%) of the second power (PWR_2), the lower limit voltage value (for example, 1.14V) of the second power (PWR_2) necessary for the operation of the removable memory device 10, and six types of contact resistances.

In each of the table of CC2 (2%) to the table of CC4 (2%), the six types of IP2 are calculated based on the formula IP2=MIN [IP2C1, IP2C1max×M×ratio]. The six types of IP1 are calculated such that IP1=IP2.

In the current class and current class guide (1') of FIG. 19D, too, the table of CC1 is divided into CC0 (maximum permissible current table) and CC1 (1%) (table illustrating current values rounded to one decimal place and CCG). In the table of CC1 (1%), an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances. In each of the table of CC2 (1%) to the table of CC4 (1%), too, an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances.

The six types of IP1 in the table of CC1 (1%) are calculated based on the nominal voltage value (2.5V) of the first power (PWR_1), the rate of power supply voltage fluctuation (−1%) of the first power (PWR_1), the lower limit voltage value (for example, 2.4V) of the first power (PWR_1) necessary for the operation of the removable memory device 10, and six types of contact resistances. The six types of IP2 in the table of CC1 (1%) are calculated based on the nominal voltage value (1.2V) of the second power (PWR_2), the rate of power supply voltage fluctuation (−1%) of the second power (PWR_2), the lower limit voltage value (for example, 1.14V) of the second power (PWR_2) necessary for the operation of the removable memory device 10, and six types of contact resistances.

In each of the table of CC2 (1%) to the table of CC4 (1%), the six types of IP1 are calculated based on the formula IP1=MIN [IP1C1, IP1C1max×M×ratio] described with reference to FIG. 15. The six types of IP2 are calculated based on the formula IP2=MIN [IP2C1, IP2C1max×M×ratio].

In the current class and current class guide (2') of FIG. 19E, too, the table of CC1 is divided into CC0 (maximum permissible current table) and CC1 (2%) (table illustrating current values rounded to one decimal place and CCG). In the table of CC1 (2%), an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances. In each of the table of CC2 (2%) to the table of CC4 (2%), too, an "IP1" column indicative of IP1, an "IP2" column indicative of IP2, a "TTL" column indicative of a sum of IP1 and IP2, a "CCG" column indicative of a CCG category, and a "CCG<IP" column indicative of a CCG category based on another classification method are defined for the respective six types of contact resistances.

The six types of IP1 in the table of CC1 (2%) are calculated based on the nominal voltage value (2.5V) of the first power (PWR_1), the rate of power supply voltage fluctuation (−2%) of the first power (PWR_1), the lower limit voltage value (for example, 2.4V) of the first power (PWR_1) necessary for the operation of the removable memory device 10, and six types of contact resistances. The six types of IP2 in the table of CC1 (2%) are calculated based on the nominal voltage value (1.2V) of the second power (PWR_2), the rate of power supply voltage fluctuation (−2%) of the second power (PWR_2), the lower limit voltage value (for example, 1.14V) of the second power (PWR_2) necessary for the operation of the removable memory device 10, and six types of contact resistances.

In each of the table of CC2 (2%) to the table of CC4 (2%), the six types of IP1 are calculated based on the formula IP1=MIN [IP1C1, IP1C1max×M×ratio]. The six types of IP2 are calculated based on the formula IP2=MIN [IP2C1, IP2C1max×M×ratio].

In each of current class and current class guide (1), current class and current class guide (2), current class and current class guide (1'), and current class and current class guide (2'), the categories of the current class guide are assigned to twenty-four types of current class classifications, based on the current class guide list of FIG. 19A.

For example, current class CC1 in which the power supply voltage fluctuation is −2% fluctuation and the contact resistance is 60 mΩ will be focused (CC162 in FIG. 19C). CC162 [IP1, IP2] is [≤2.5 A, ≤1.8 A]. IP1=2.5 A falls within the current range (2.0 to 2.6) of CCG-B, and IP2=1.8 A is a current value less than or equal to the current range (2.0 to 2.6) of CCG-B. CCG-B(2) is therefore assigned to CC162. A device in which CC162 [IP1, IP2]=[≤2.5 A, ≤1.8 A] is determined as a CCG-B(2) compatible device.

In addition, for example, current class CC4 in which the power supply voltage fluctuation is −1% fluctuation and the contact resistance is 50 mΩ will be focused (CC451 in FIG. 19B). CC451 [IP1, IP2] is [≤1.7 A, ≤1.7 A]. CCG-D(1) is assigned to CC451 since 1.7 A is included in the current range (<1.7) of CCG-D. A device in which CC451 [IP1, IP2]=[≤1.7 A, ≤1.7 A] is determined as a CCG-D(1) compatible device.

As described above, the category of the current class guide can also be determined using the condition that MIN [IP1, IP2]) exceeds the upper limit current value (CCG<IP). For example, when CC151 in FIG. 19B is focused, 2.8 A, which is the minimum value of 3.6 A and 2.8 A, exceeds the upper limit current value of 2.6 A of CCG-B. CCG-B is therefore assigned to the "CCG<IP" column of CC151. In this case, a device in which CC151 [IP1, IP2]=[≤3.6 A, ≤2.8 A] is determined as a CCG-B compatible device.

Current class and current class guide (1), current class and current class guide (2), current class and current class guide (1'), and current class and current class guide (2') can be used as follows in Business to Business (B2B) environment.

The host manufacturer determines the Current Class (CC) from the rate of power supply voltage fluctuation (1% or 2%) of the device power supply circuit, the contact resistance of the device socket, and the maximum current that can be distributed to the device. Next, the host manufacturer determines the CCG in consideration of the required performance of the removable memory device. Then, the host manufacturer requests the device manufacturer to provide a device that satisfies the required performance and the CC, using Request For Information (RFI). Where, a device that satisfies the CC is a device that satisfies CCG-A~CCG-D in the "CCG" column or the "CCG<IP" column.

(Example 1) In a case where the rate of power supply voltage fluctuation of a power supply circuit for the device=1%, the contact resistance of the device socket=60 mΩ, the device distribution current consumption [IP1, IP2] =[2.4 A, 2.0 A], and the required performance=3 GB/s, the host manufacturer selects CC261 and requests the device manufacturer to provide a device of CCG-B or lower, using in the RFI to the device manufacturer.

(Example 2) In a case where the rate of power supply voltage fluctuation of a power supply circuit for the device=2%, the contact resistance of the device socket=60 mΩ, the device distribution current consumption [IP1, IP2] =[1.7 A, 1.7 A], and the required performance=2 GB/s, the host manufacturer selects CC462 and requests the device manufacturer to provide a device of CCG-D or lower, using the RFI to the device manufacturer.

The device manufacturer determines the device product specifications in which the current consumption is less than or equal to that of any of CCG-A to D in the current class guide list in FIG. 19A and satisfies the required performance.

(Example 1) For a device product having a performance of 2.5 GB/s and a current consumption of IP1=2.4 A and IP2<=2.0 A, the device manufacturer declares CCG-B and guarantees the operation within the current consumption corresponding to CCG-B. As a method of declaration of CCG-B, a method of describing CCG-B in a data sheet, a method of marking a logo indicative of CCG-B on a device product, or the like can be used.

(Example 2) For a device product having a performance of 2.0 GB/s and a current consumption of IP1=1.9 A and IP2=1.7 A, the device manufacturer declares CCG-C.

A logo indicative of the current class (all or part of CC #$%) may be used instead of the logo indicative of the category of the current class guide. In addition, information indicative of the category of the current class guide or information indicative of the current class may be stored in a register in the controller 14 capable of reading from the host.

Figure 20:
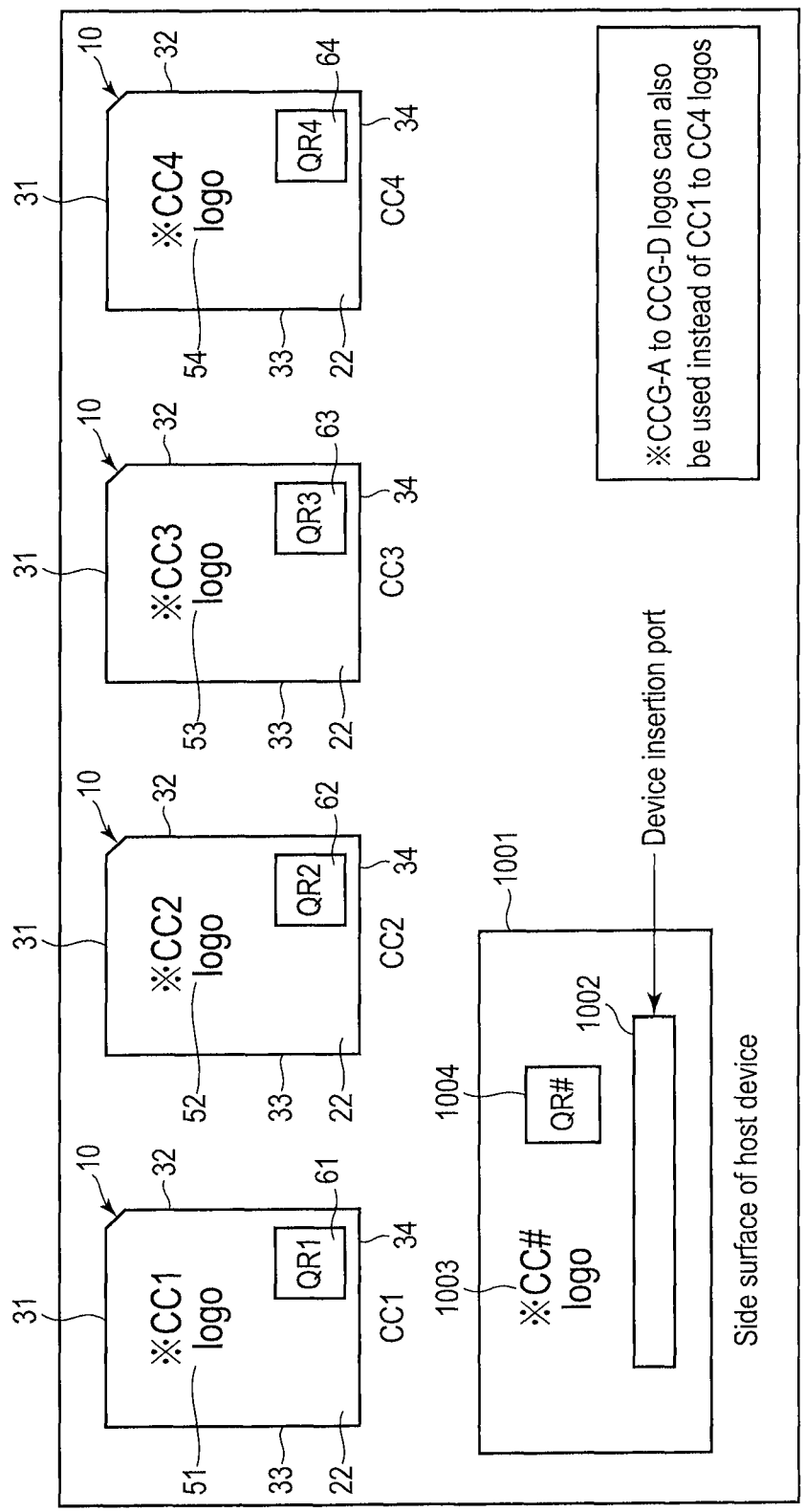
FIG. 20 is a diagram illustrating logos and two-dimensional barcodes marked on one surface of packages of the removable memory device according to the embodiment, and a logo and a two-dimensional barcode marked on a housing of a host.

FIG. 20 is a diagram illustrating a logo and a two-dimensional barcode marked on one surface 22 of the package 11 of the removable memory device 10 according to the embodiment, and a logo 1003 and a two-dimensional barcode 1004 marked on a housing 1001 of the host.

In the removable memory device 10, a logo and a two-dimensional barcode are marked on a surface 22 of the package 11 to urge the user to visually identify the current consumption class or current consumption class guide supported by the removable memory device 10.

When the removable memory device 10 supports CC1, a logo 51 on a surface 22 of the package 11 of the removable memory device 10 indicates that the removable memory device 10 supports CC1. In addition, a two-dimensional barcode 61 on the surface 22 of the removable memory device 10 also indicates that the removable memory device 10 supports CC1. In addition, the two-dimensional barcode 61 may also include information indicative of the current consumption value of each power of the removable memory device 10.

Alternatively, when the removable memory device 10 is classified into the current consumption class guide CCG-A, the logo 51 may display CCG-A. In addition, the two-dimensional barcode 61 may indicate that the removable memory device 10 is classified into current consumption class guide CCG-A.

Similarly, when the removable memory device 10 supports CC2, a logo 52 on the surface 22 of the package 11 of the removable memory device 10 indicates that the removable memory device 10 supports CC2.

In addition, a two-dimensional barcode 62 on the surface 22 of the removable memory device 10 also indicates that the removable memory device 10 supports CC2. In addition, the two-dimensional barcode 62 may also include information indicative of the current consumption value of each power of the removable memory device 10.

Alternatively, when the removable memory device 10 is classified into the current consumption class guide CCG-B, the logo 52 may display CCG-B. In addition, the two-dimensional barcode 62 may indicate that the removable memory device 10 is classified into current consumption class guide CCG-B.

When the removable memory device 10 supports CC3, a logo 53 on the surface 22 of the package 11 of the removable memory device 10 indicates that the removable memory device 10 supports CC3. In addition, a two-dimensional barcode 63 on the surface 22 of the removable memory device 10 also indicates that the removable memory device 10 supports CC3. In addition, the two-dimensional barcode 63 may also include information indicative of the current consumption value of each power of the removable memory device 10.

Alternatively, when the removable memory device 10 is classified into the current consumption class guide CCG-C, the logo 53 may display CCG-C. In addition, the two-dimensional barcode 63 may indicate that the removable memory device 10 is classified into current consumption class guide CCG-C.

When the removable memory device 10 supports CC4, a logo 54 on the surface 22 of the package 11 of the removable memory device 10 indicates that the removable memory device 10 supports CC4. In addition, a two-dimensional barcode 64 on the surface 22 of the removable memory device 10 also indicates that the removable memory device 10 supports CC4. In addition, the two-dimensional barcode 64 may also include information indicative of the current consumption value of each power of the removable memory device 10.

Alternatively, when the removable memory device 10 is classified into the current consumption class guide CCG-D, the logo 54 may display CCG-D. In addition, the two-dimensional barcode 64 may indicate that the removable memory device 10 is classified into current consumption class guide CCG-D.

In addition, a logo 1003 and a two-dimensional bar code 1004 may also be marked on the side surface of the housing 1001 of the host to indicate the current consumption class supported by the host. The logo 1003 and the two-dimensional barcode 1004 may be marked on the same side surface as a side surface on which an insertion slot 1002 of the removable memory device 10 is provided.

The logo 1003 is indicative of the current consumption class supported by the host. In addition, the logo 1003 may also include information such as the contact resistance, the power supply voltage fluctuation, and the current consumption class guide in the host. The two-dimensional barcode 1004 indicates that the removable memory device 10 supports CC4. In addition, the two-dimensional barcode 1004 may also include information such as the contact resistance, the power supply voltage fluctuation, and the current consumption class guide in the host.

Alternatively, the logo 1003 may display a current consumption class guide into which the host is classified. Alternatively, the two-dimensional barcode 1003 may be indicative of the current consumption class guide into which the host is classified.

The user can identify whether or not the removable memory device 10 and the host are an available combination, by referring to the logos and the two-dimensional barcodes displayed on each of the removable memory device 10 and the host.

Figure 21:
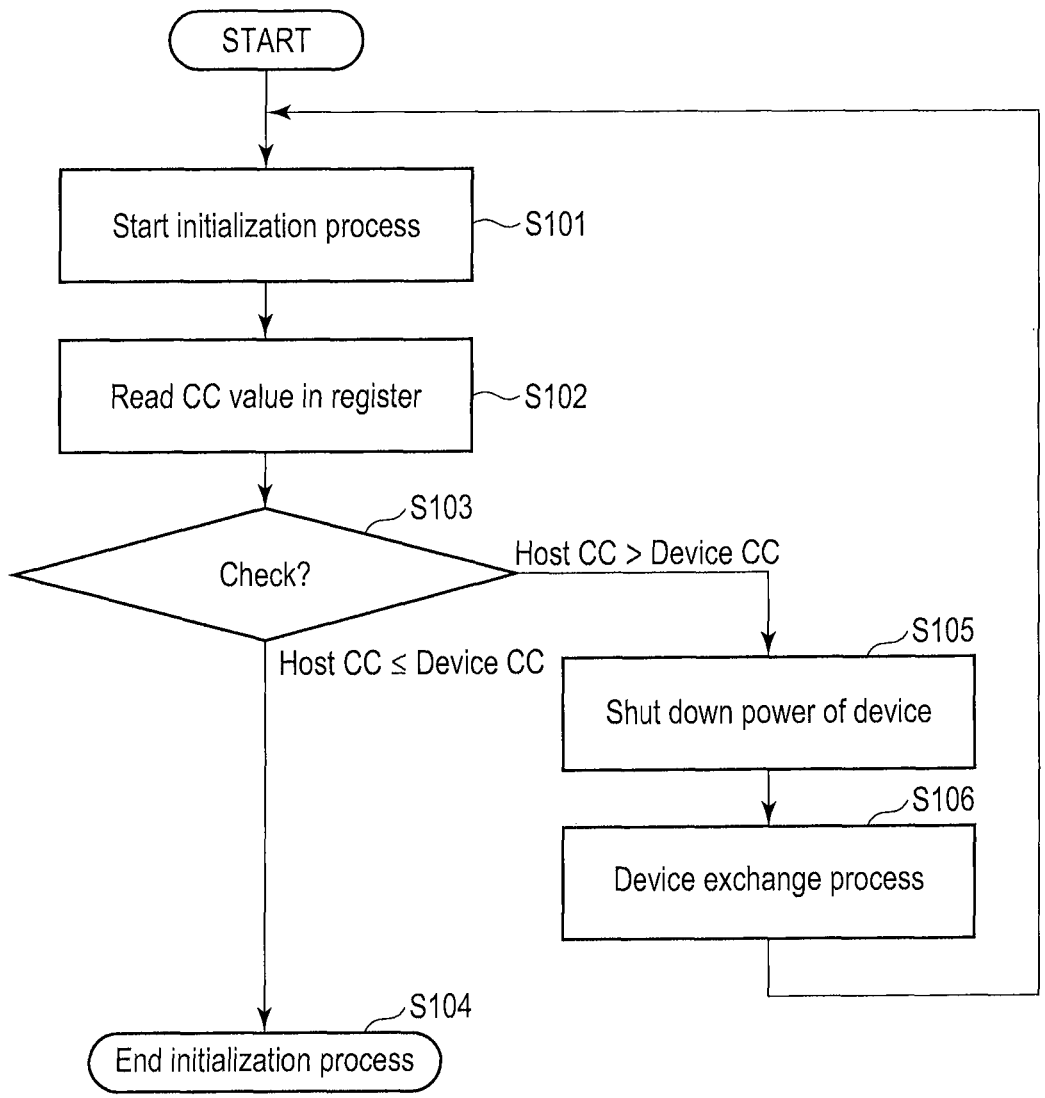
FIG. 21 is a flowchart illustrating a procedure of a device initialization process executed in the host.

FIG. 21 is a flowchart illustrating procedure of a device initialization process executed in the host.

First, the host starts the initialization process when the removable memory device 10 is inserted into the socket 100 of the host in a state in which the power of the host is on or when the power of the host is on in a state in which the removable memory device 10 is preliminarily inserted into the socket 100 of the host (step S101).

The host reads the CC value in the register of the removable memory device 10 (step S102). The register is provided in the controller 14, and may store information indicative of the current consumption class supported by the removable memory device 10, or information indicative of the current consumption value for the first power (PWR_1), the current consumption value for the second power (PWR_2), and the current consumption class category into which the removable memory device 10 is classified.

The host checks whether or not a normal operation can be executed (step S103).

When the number of the current consumption class supported by the host is smaller than the number of the current consumption class supported by the removable memory device 10 (HostCC DeviceCC in step S103), the host ends the initialization process (step S104).

On the other hand, when the number of the current consumption class supported by the host is larger than the number of the current consumption class supported by the removable memory device 10 (HostCC>DeviceCC in step S103), the host shuts down the power of the removable memory device 10. (step S105). This is because the current value of each power that can be supplied by the host is smaller than the current value of each power required by the removable memory device 10.

After that, when the removable memory device 10 inserted into the host is replaced by the user (step S106), the host starts the initialization process again (step S101).

Figure 22:
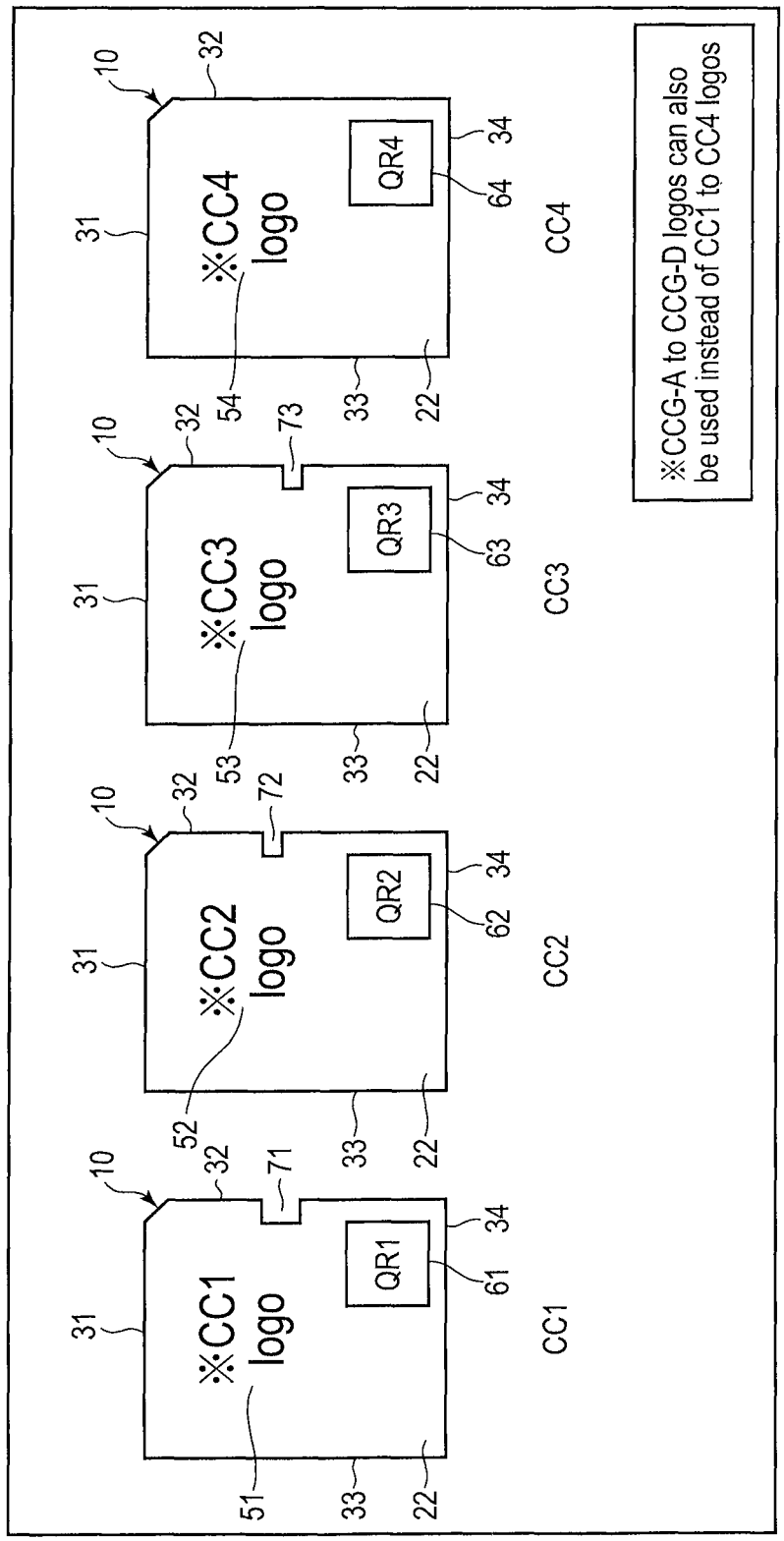
FIG. 22 is a diagram illustrating a notch for identifying the current consumption classes supported by the removable memory device, which are formed in the packages of the removable memory device according to the embodiment.

FIG. 22 is a diagram illustrating a notch for identifying the current consumption class supported by the removable memory device 10, which is formed in the package 11 of the removable memory device 10 according to the embodiment.

The removable memory device 10 may have a notch as a mechanism for the host to identify the current consumption class supported by the removable memory device 10.

The removable memory device 10 supporting CC1 has a notch 71 on one side 32 of the package 11, the removable memory device 10 supporting CC2 has a notch 72 on one side 32 of the package 11, and the removable memory device 10 supporting CC3 has a notch 73 on one side 32 of the package 11. Each notch provided on the package 11 may be provided on any side of the package 11 as long as the notch does not affect each terminal of the removable memory device 10.

In addition, for example, two switches may be provided in the socket 100 in order to identify the four current consumption classes CC1 to CC4. These switches may detect the notch when removable memory device 10 is inserted into socket 100.

The host identifies the current consumption class of the removable memory device 10 inserted into the socket 100 from the combination of on and off of each of the two switches.

In addition, the information identified by the notch may be the current consumption class category into which the removable memory device 10 is classified.

Figure 23:
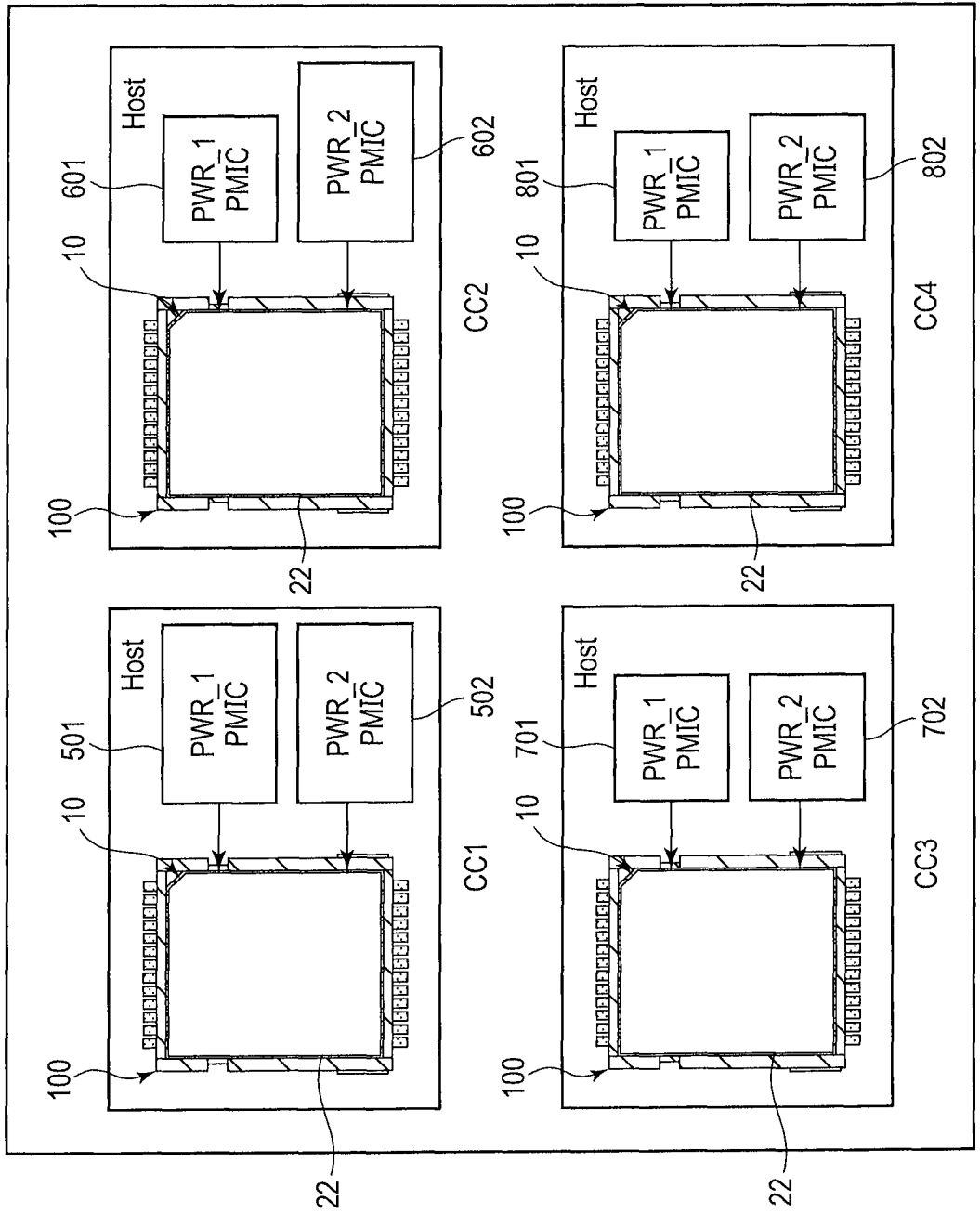
FIG. 23 is a diagram illustrating power configuration examples on the host side corresponding to four types of current consumption classes, respectively.

FIG. 23 is a diagram illustrating power configuration examples on the host side corresponding to four types of current consumption classes, respectively.

In FIG. 23, a state in which the removable memory device 10 supporting each current consumption class is inserted into the socket 100 on the printed circuit board of the host is illustrated.

The printed circuit board of the host is provided with the socket 100, a power supply circuit (Power Management Integrated Circuit, PMIC) 501 for supplying the first power (PWR_1) to the removable memory device 10, and a power supply circuit (PMIC) 502 for supplying the second power (PWR_2) to the removable memory device 10.

When the current consumption class supported by the removable memory device 10 and the host is CC1, the permissible current consumption reduction rate in CC1 is 100% for the current consumption value for the first power and is also 100% for the current consumption value for the second power. The removable memory device 10 and the host are designed in consideration of the current consumption classes they support respectively. For this reason, the first power supply circuit (PMIC) 501 and the second power supply circuit (PMIC) 502 on the printed circuit board of the host are designed to be capable of outputting a current corresponding to the current consumption specified by CC1.

In addition, when the current consumption class supported by the removable memory device 10 and the host is CC2, the permissible current consumption reduction rate is 72%. The removable memory device 10 and the host are designed in consideration of the current consumption classes they support respectively. For this reason, a first power supply circuit (PMIC) 601 and a second power supply circuit (PMIC) 602 on the printed circuit board of the host are designed to be capable of outputting a current corresponding to the current consumption specified by CC2. In other words, in designing the host that supports CC2, the first power supply circuit (PMIC) 601 can be prevented from being over-specified, and cost reduction and optimization can be achieved by preliminarily designing the output current value of the first power supply circuit (PMIC) 601 to a lower value than the output current value of the first power supply circuit (PMIC) 501 in CC1.

In addition, since the first power supply circuit (PMIC) 601 is implemented with an output current value lower than that of the first power supply circuit (PMIC) 501, it is possible to reduce the area occupied by the power supply circuit on the printed circuit board of the host.

In addition, when the current consumption class supported by the removable memory device 10 and the host is CC3, the permissible current consumption reduction rate is 56%. The removable memory device 10 and the host are designed in consideration of the current consumption classes they support respectively. For this reason, a first power supply circuit (PMIC) 701 and a second power supply circuit (PMIC) 702 on the printed circuit board of the host are designed to be capable of outputting a current corresponding to the current consumption specified by CC3. In other words, in designing the host that supports CC3, the first power supply circuit (PMIC) 701 and the second power supply circuit (PMIC) 702 can be prevented from being over-specified, and cost reduction and optimization can be achieved by preliminarily designing the output current values of the first power supply circuit (PMIC) 701 and second power supply circuit (PMIC) 702 to lower values than the output current values of the first power supply circuit (PMIC) 501 and the second power supply circuit (PMIC) 502 in CC1, respectively.

In addition, since the first power supply circuit (PMIC) 701 and the second power supply circuit (PMIC) 702 are implemented with output current values lower than those of the first power supply circuit (PMIC) 501 and the second power supply circuit (PMIC) 502, it is possible to reduce the area occupied by the power supply circuit on the printed circuit board of the host. Furthermore, the second power supply circuit (PMIC) 702 is expected to be implemented on a smaller scale than the second power supply circuit (PMIC) 602 in CC2. Therefore, the area occupied by the power supply circuit on the printed circuit board of the host supporting CC3 is expected to be smaller than the area occupied by the power supply circuit on the printed circuit board of the host supporting CC2.

Furthermore, when the current consumption class supported by the removable memory device 10 and the host is CC4, the permissible current consumption reduction rate in CC4 is 47%. The removable memory device 10 and the host are designed in consideration of the current consumption classes they support respectively. For this reason, a first power supply circuit (PMIC) 801 and a second power supply circuit (PMIC) 802 on the printed circuit board of the host are designed to be capable of outputting a current corresponding to the current consumption specified by CC4. In other words, in designing the host that supports CC4, the first power supply circuit (PMIC) 801 and the second power supply circuit (PMIC) 802 can be prevented from being over-specified, and cost reduction and optimization can be achieved by preliminarily designing the output current values of the first power supply circuit (PMIC) 801 and second power supply circuit (PMIC) 802 to lower values than the output current values of the first power supply circuit (PMIC) 501 and the second power supply circuit (PMIC) 502 in CC1, respectively.

In addition, since the first power supply circuit (PMIC) 801 and the second power supply circuit (PMIC) 802 are implemented with output current values lower than those of the first power supply circuit (PMIC) 501 and the second power supply circuit (PMIC) 502, it is possible to reduce the area occupied by the power supply circuit on the printed circuit board of the host. Furthermore, the first power supply circuit (PMIC) 801 is expected to be implemented on a smaller scale than the first power supply circuit (PMIC) 701 in CC3. Therefore, the area occupied by the power supply circuit on the printed circuit board of the host supporting CC4 is expected to be smaller than the area occupied by the power supply circuit on the printed circuit board of the host supporting CC3.

In other words, the scale of the power supply circuit can be optimized by recognizing the current consumption class expected for the host in advance.

Figure 24:
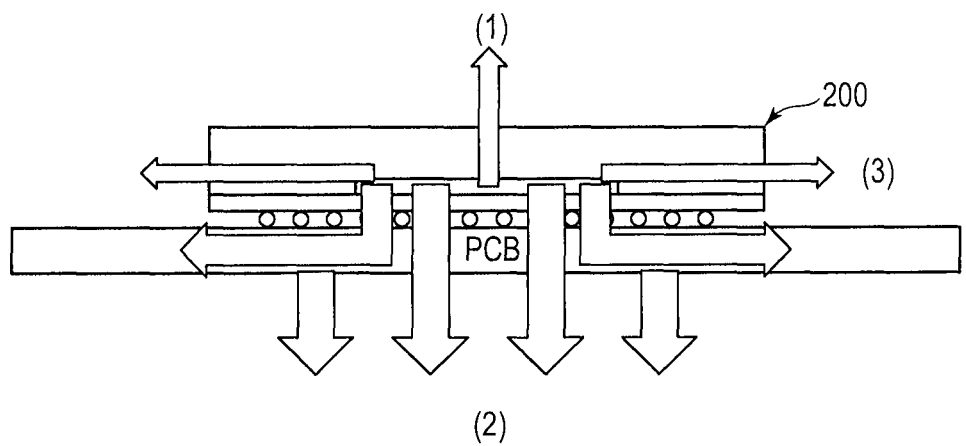
FIG. 24 is a view illustrating heat dissipation paths of the device.

FIG. 24 is a view illustrating heat dissipation paths of the device.

As regards a general device 200, the heat generated by the operation of the device 200 is mainly dissipated along three heat dissipation paths (1) to (3).

(1) is a path through which heat is conducted to an upper part of a surface of a package of the device 200 and heat is transferred from the package to the air.

(2) is a path through which heat is conducted through terminals connecting the device 200 and a PCB and heat is transferred from the PCB to the air.

(3) is a path through which heat is conducted to side parts of the surface of the package of the device 200 and heat is transferred from the package to the air.

When a thermally conductive member such as a thermal interface material (TIM) is not mounted on the upper part of the surface of the package, (2) is the main heat dissipation path of the heat generated in the device 200.

Figure 25:
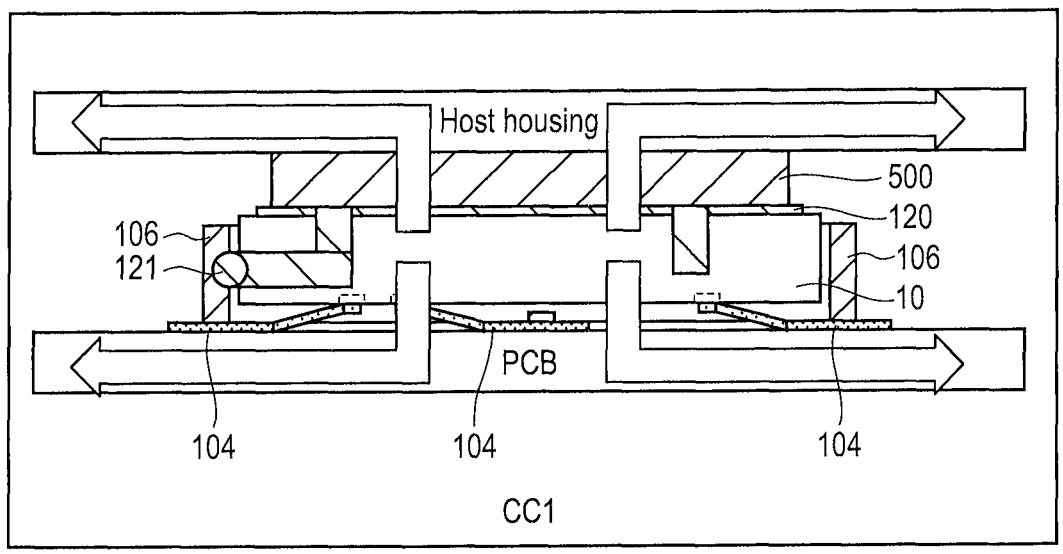
FIG. 25 is a view illustrating a configuration example of a heat dissipation mechanism on the host side corresponding to the power configuration of the current consumption class with large current consumption.

FIG. 25 is a view illustrating a configuration example of a heat dissipation mechanism on the host side corresponding to the power configuration of the current consumption class with the largest current consumption.

In the power configuration of the host which supports the current consumption class CC1, the current consumption value becomes maximum. For this reason, it is assumed that the amount of heat generated from the removable memory device 10 increases as compared to the other current consumption classes. Therefore, a measurement such as attaching a thermally conductive member such as TIM500 can be designed in advance.

In contrast, FIG. 26 is a view illustrating a configuration example of a heat dissipation mechanism on the host side corresponding to the power configuration of the current consumption class with small current consumption.

In the power configuration of the host which supports the current consumption class CC4, the current consumption value becomes smaller than that of the power configuration of the host which supports CC1. Therefore, the amount of heat generated by operating the removable memory device 10 supporting CC4 becomes smaller than that in a case where the removable memory device 10 supporting CC1 operates. For this reason, a thermally conductive member such as TIM500 as illustrated in FIG. 25 does not need to be prepared.

In other words, a heat dissipation design necessary for the printed circuit board of the host can be grasped and excessive costs caused by taking excessive measures can be avoided, by considering the current consumption class.

As described above, according to the present embodiment, plural types of current classes different in current consumption from each other are defined. In each current class, the current consumption (permissible current value) is defined for each power of the removable memory device 10 having the multiple power configuration. When the current class supported by the removable memory device 10 is CC1, the first current consumption value consumed from the first power (PWR_1) by the removable memory device 10 is smaller than or equal to a first permissible current value that is the maximum current value permitted to be supplied from the host to the first power supply terminal (P128, P130, and P131) of the removable memory device 10 via the contact resistance between a terminal of the socket 100 and a terminal of the removable memory device 10. In addition, the second current consumption value consumed from the second power (PWR_2) by the removable memory device 10 is smaller than or equal to the second permissible current value that is the maximum current value permitted to be supplied from the host to the second power supply terminal (P124, P125, and P127) of the removable memory device 10 via the contact resistance between a terminal of the socket 100 and a terminal of the removable memory device 10.

When the current consumption class supported by the removable memory device 10 is one of CC2 to CC4, the first current consumption value consumed from the first power (PWR_1) by the removable memory device 10 is smaller than or equal to a third permissible current value for the first power (PWR_1) defined in this CC class, and the second current consumption value consumed from the second power (PWR_2) by the removable memory device 10 is lower than or equal to a fourth permissible current value for the second power (PWR_2) defined in this current consumption class.

Therefore, the current consumption value (maximum current consumption value) necessary for the operation of the removable memory device 10 can be determined for each power, according to which current class of the plural types of current classes is the current class supported by the removable memory device 10.

Therefore, when the current consumption class of the removable memory device 10 to be used in the host is CC1, the host manufacturer can adopt the power configuration that the power supply circuit capable of supplying the first and second permissible current values corresponding to CC1 is mounted on the host. Any device product supporting CC1 can be thereby normally used in the host corresponding to CC1.

In addition, when the current class of the removable memory device 10 to be used in the host is any one of CC2 to CC4 with less current consumption than CC1, the host manufacturer can optimize the capability of the power supply circuit on the host side for each power, based on the permissible current value of each power corresponding to this current class, and can reduce the costs of the power supply circuit on the host side.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A removable memory device insertable into and detachable from a socket in a host and operating with first and second powers supplied from the host, the first and second powers having voltages different from each other, the removable memory device comprising:

a plurality of terminals including one or more first power supply terminals to which the first power is supplied and one or more second power supply terminals to which the second power is supplied;

a nonvolatile memory; and a controller configured to control the nonvolatile memory, wherein the removable memory device is configured to support one current consumption class among plural types of current consumption classes defining a plurality of current consumptions different from each other, both a current consumption for the first power and a current consumption for the second power being defined in each of the plural types of current consumption classes, in a case where the one current consumption class supported by the removable memory device is a first current consumption class having a largest current consumption value among the plural types of current consumption classes, a first current consumption value consumed from the first power by the removable memory device is smaller than or equal to a first permissible current value that is a maximum current value permitted to be supplied from the host to the one or more first power supply terminals of the removable memory device via a contact resistance between a terminal of the socket and a terminal of the removable memory device, and a second current consumption value consumed from the second power by the removable memory device is smaller than or equal to a second permissible current value that is a maximum current value permitted to be supplied from the host to the one or more second power supply terminals of the removable memory device via the contact resistance, and in a case where the one current consumption class supported by the removable memory device is another current consumption class different from the first current consumption class, the first current consumption value is smaller than or equal to a third permissible current value for the first power defined in said another current consumption class, and the second current consumption value is smaller than or equal to a fourth permissible current value for the second power defined in said another current consumption class.

2. The removable memory device of claim 1, wherein the first permissible current value is obtained based on a nominal voltage value of the first power, a rate of power supply voltage fluctuation of the first power, the contact resistance, and a lower limit voltage value of the first power necessary for an operation of the removable memory device.

3. The removable memory device of claim 2, wherein the second permissible current value is obtained based on a nominal voltage value of the second power, a rate of power supply voltage fluctuation of the second power, the contact resistance, and a lower limit voltage value of the second power necessary for an operation of the removable memory device.

4. The removable memory device of claim 1, wherein the first permissible current value is a value obtained by multiplying a permissible current value of the first power per one power supply terminal by the number of the first power supply terminals, and the permissible current value of the first power per the one power supply terminal is obtained based on a nominal voltage value of the first power, a rate of power supply voltage fluctuation of the first power, the contact resistance, and a lower limit voltage value of the first power necessary for an operation of the removable memory device.

5. The removable memory device of claim 4, wherein the second permissible current value is a value obtained by multiplying a permissible current value of the second power per one power supply terminal by the number of the second power supply terminals, and the permissible current value of the second power per the one power supply terminal is obtained based on a nominal voltage value of the second power, a rate of power supply voltage fluctuation of the second power, the contact resistance, and a lower limit voltage value of the second power necessary for an operation of the removable memory device.

6. The removable memory device of claim 1, wherein information indicative of the one current consumption class supported by the removable memory device or information indicative of one category among plural types of categories into which the removable memory device is classified based on the first and second current consumption values of the removable memory device and performance of the removable memory device, is stored in a register in the controller readable from the host.

7. The removable memory device of claim 1, wherein a logo indicative of the one current consumption class supported by the removable memory device or a logo indicative of one category among plural types of categories into which the removable memory device is classified based on the first and second current consumption values of the removable memory device and performance of the removable memory device, is marked on a surface of a package of the removable memory device.

8. The removable memory device of claim 1, wherein a two-dimensional barcode indicative of information on the one current consumption class supported by the removable memory device or a two-dimensional barcode indicative of information on one category among plural types of categories into which the removable memory device is classified based on the first and second current consumption values of the removable memory device and performance of the removable memory device, is marked on a surface of a package of the removable memory device.

9. The removable memory device of claim 1, wherein a notch for identifying the one current consumption class supported by the removable memory device or one category among plural types of categories in which the removable memory device is classified based on the first and second current consumption values of the removable memory device and performance of the removable memory device, is formed on a package of the removable memory device.

10. A removable memory device insertable into and detachable from a socket in a host and operating with first and second powers supplied from the host, the first and second powers having voltages different from each other, the removable memory device comprising:

a plurality of terminals including one or more first power supply terminals to which the first power is supplied and one or more second power supply terminals to which the second power is supplied;

a nonvolatile memory; and a controller configured to control the nonvolatile memory, wherein the removable memory device is configured to support one current consumption class among plural types of current consumption classes, plural types of permissible current values corresponding to plural types of contact resistances being defined as a current consumption for the first power, different plural types of permissible current values corresponding to the plural types of contact resistances being defined as a current consumption for the second power, in each of the plural types of current consumption classes, in a case where the one current consumption class supported by the removable memory device is a first current consumption class having a largest current consumption value among the plural types of current consumption classes and where a contact resistance between a terminal of the socket and a terminal of the removable memory device is a first contact resistance among the plural types of contact resistances, a first current consumption value consumed from the first power by the removable memory device is smaller than or equal to a first permissible current value obtained based on a nominal voltage value of the first power, a rate of power supply voltage fluctuation of the first power, the first contact resistance, and a lower limit voltage value of the first power necessary for an operation of the removable memory device, and a second current consumption value consumed from the second power by the removable memory device is smaller than or equal to a second permissible current value obtained based on a nominal voltage value of the second power, a rate of power supply voltage fluctuation of the second power, the first contact resistance, and a lower limit voltage value of the second power necessary for the operation of the removable memory device, and in a case where the one current consumption class supported by the removable memory device is another current consumption class different from the first current consumption class and where the contact resistance between the terminal of the socket and the terminal of the removable memory device is the first contact resistance, the first current consumption value is smaller than or equal to a smallest value of (1) the first permissible current value and (2) a value obtained by multiplying a maximum permissible current value of the plural types of permissible current values for the first power defined in the first current consumption class by a ratio assigned to said another current consumption class, and the second current consumption value is smaller than or equal to a smallest value of (3) the second permissible current value and (4) a value obtained by multiplying a maximum permissible current value of the different plural types of permissible current values for the second power defined in the first current consumption class by the ratio.

11. The removable memory device of claim 10, wherein information indicative of the one current consumption class supported by the removable memory device or information indicative of one category among plural types of categories into which the removable memory device is classified based on the first and second current consumption values of the removable memory device and performance of the removable memory device, is stored in a register in the controller readable from the host.

12. The removable memory device of claim 10, wherein a logo indicative of the one current consumption class supported by the removable memory device or a logo indicative of one category among plural types of categories into which the removable memory device is classified based on the first and second current consumption values of the removable memory device and performance of the removable memory device, is marked on a surface of a package of the removable memory device.

13. The removable memory device of claim 10, wherein a two-dimensional barcode indicative of information on the one current consumption class supported by the removable memory device or a two-dimensional barcode indicative of information on one category among plural types of categories into which the removable memory device is classified based on the first and second current consumption values of the removable memory device and performance of the removable memory device, is marked on a surface of a package of the removable memory device.

14. The removable memory device of claim 10, wherein a notch for identifying the one current consumption class supported by the removable memory device or one category among plural types of categories into which the removable memory device is classified based on the first and second current consumption values of the removable memory device and performance of the removable memory device, is formed on a package of the removable memory device.

* * * * *